United States Patent
Tardiou et al.

(10) Patent No.: US 11,410,214 B2
(45) Date of Patent: Aug. 9, 2022

(54) SYSTEMS AND METHODS FOR SECURE REQUESTS FOR QUOTATIONS

(71) Applicant: Accenture Global Solutions Limited, Dublin (IE)

(72) Inventors: Hugo Tardiou, Sainte-Maxime (FR); Haris Pasic, Biot (FR); Hugo Borne-Pons, Antibes (FR)

(73) Assignee: Accenture Global Solutions Limited, Dublin (IE)

(*) Notice: Subject to any disclaimer, the term of this patent is extended or adjusted under 35 U.S.C. 154(b) by 231 days.

(21) Appl. No.: 16/902,617

(22) Filed: Jun. 16, 2020

(65) Prior Publication Data
US 2021/0390599 A1  Dec. 16, 2021

(51) Int. Cl.
*G06Q 30/06* (2012.01)
*G06Q 50/18* (2012.01)
*H04L 9/00* (2022.01)

(52) U.S. Cl.
CPC ....... *G06Q 30/0611* (2013.01); *G06Q 50/188* (2013.01); *H04L 9/008* (2013.01)

(58) Field of Classification Search
CPC .................. G06Q 30/0611; G06Q 50/188
See application file for complete search history.

(56) References Cited

U.S. PATENT DOCUMENTS

| | | | | |
|---|---|---|---|---|
| 10,713,669 B2* | 7/2020 | Noyes | ................ | G06Q 30/0206 |
| 11,042,934 B2* | 6/2021 | Singh | .................... | G06Q 40/04 |
| 2014/0279166 A1* | 9/2014 | Bilik | .................... | G06Q 10/083 705/26.4 |
| 2020/0097661 A1* | 3/2020 | Block | ................... | H04L 9/3271 |
| 2020/0175509 A1* | 6/2020 | Qi | ........................ | G06Q 20/389 |
| 2021/0105276 A1* | 4/2021 | Collinson | ............ | H04L 63/101 |

(Continued)

OTHER PUBLICATIONS

Blockchain-based smart contract for energy demand management. Wang, Xiaonan & Yang, Wentao & Noor, Sana & Chen, Chang & Guo, Miao & Van Dam, Koen. 10th International Conference on Applied Energy (ICAE2018), Aug. 22-25, 2018, Hong Kong. Retrieved via Science Direct. (Year: 2018).*

(Continued)

*Primary Examiner* — Michael Misiaszek
(74) *Attorney, Agent, or Firm* — Harrity & Harrity, LLP

(57) ABSTRACT

A device may receive entity data identifying parameters needed by entities to generate a quotation, and entity encryption data identifying homomorphic encryption schemes supported by the entities. The device may receive, from a client device, a smart contract that includes a request for a quotation, client encryption data identifying homomorphic encryption schemes supported by the client device, and identification data identifying the entities. The device may encrypt the data included in the smart contract, based on the entity encryption data and the client encryption data, to generate encrypted data. The device may generate a modified smart contact by replacing the data included in the smart contract with references to the encrypted data. The device may provide the modified smart contract to server devices associated with the entities. The device may receive, from the server devices associated with the entities, the modified smart contract with quotations.

20 Claims, 18 Drawing Sheets

(56) References Cited

U.S. PATENT DOCUMENTS

2021/0201418 A1* 7/2021 Mehedy ................. G06Q 40/08
2021/0314140 A1* 10/2021 Stephenson ............... H04L 9/12

OTHER PUBLICATIONS

"Verifying the Integrity of Private Transaction Information in Smart Contract using Homomorphic Encryption," Y. Yoon and J. Moon. 2019 IEEE Eurasia Conference on IOT, Communication and Engineering (ECICE), 2019, pp. 38-40, doi: 10.1109/ECICE47484.2019. 8942648. Retrieved via ProQuest (Year: 2019).*

Blass et al., "BOREALIS: Building Block for Sealed Bid Auctions on Blockchains," In Proceedings of the 15th ACM Asia Conference on Computer and Communications Security (ASIA CCS '20), Jun. 1-5, 2020, Taipei, Taiwan, ACM, New York, NY, USA, 14 pages.

* cited by examiner

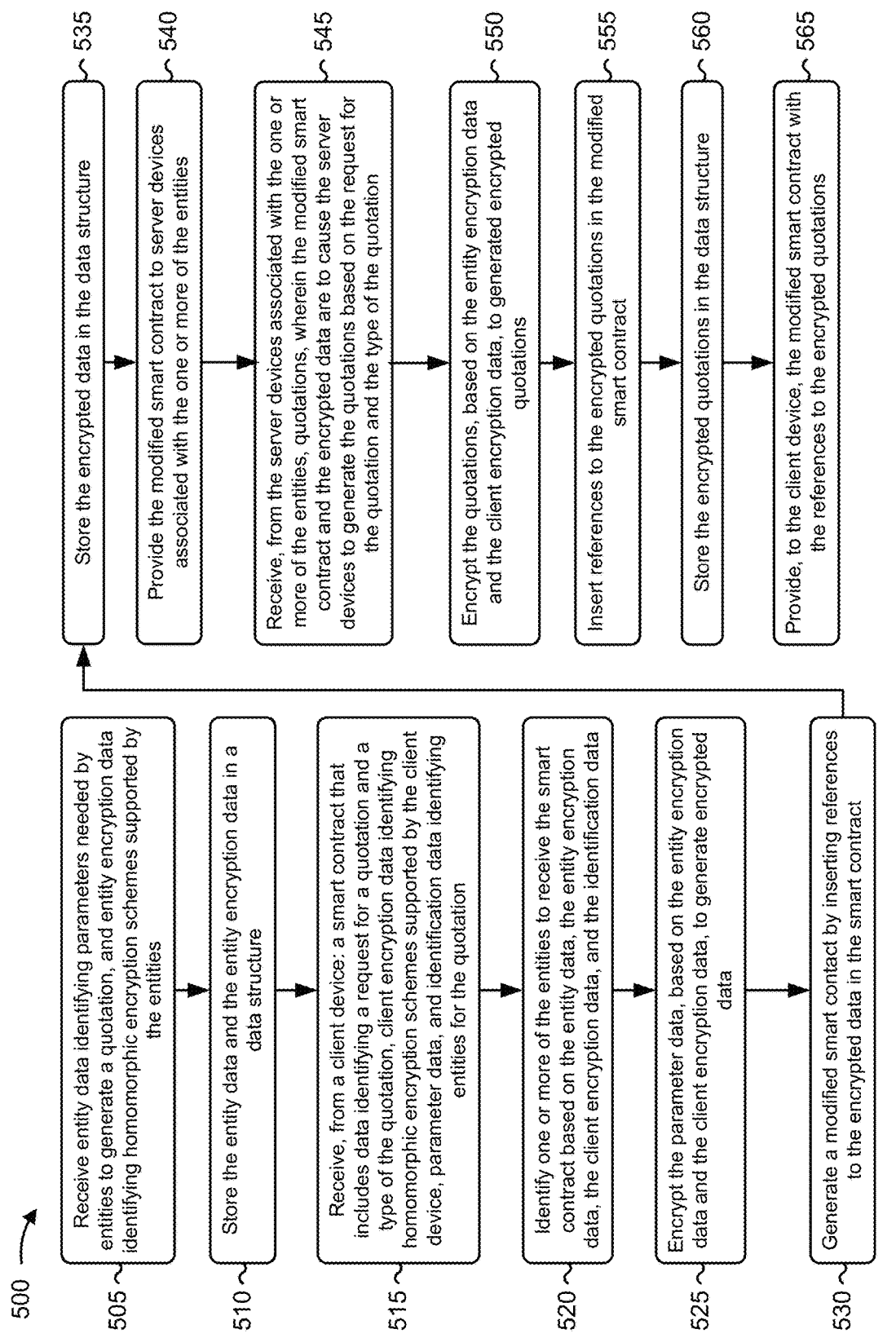

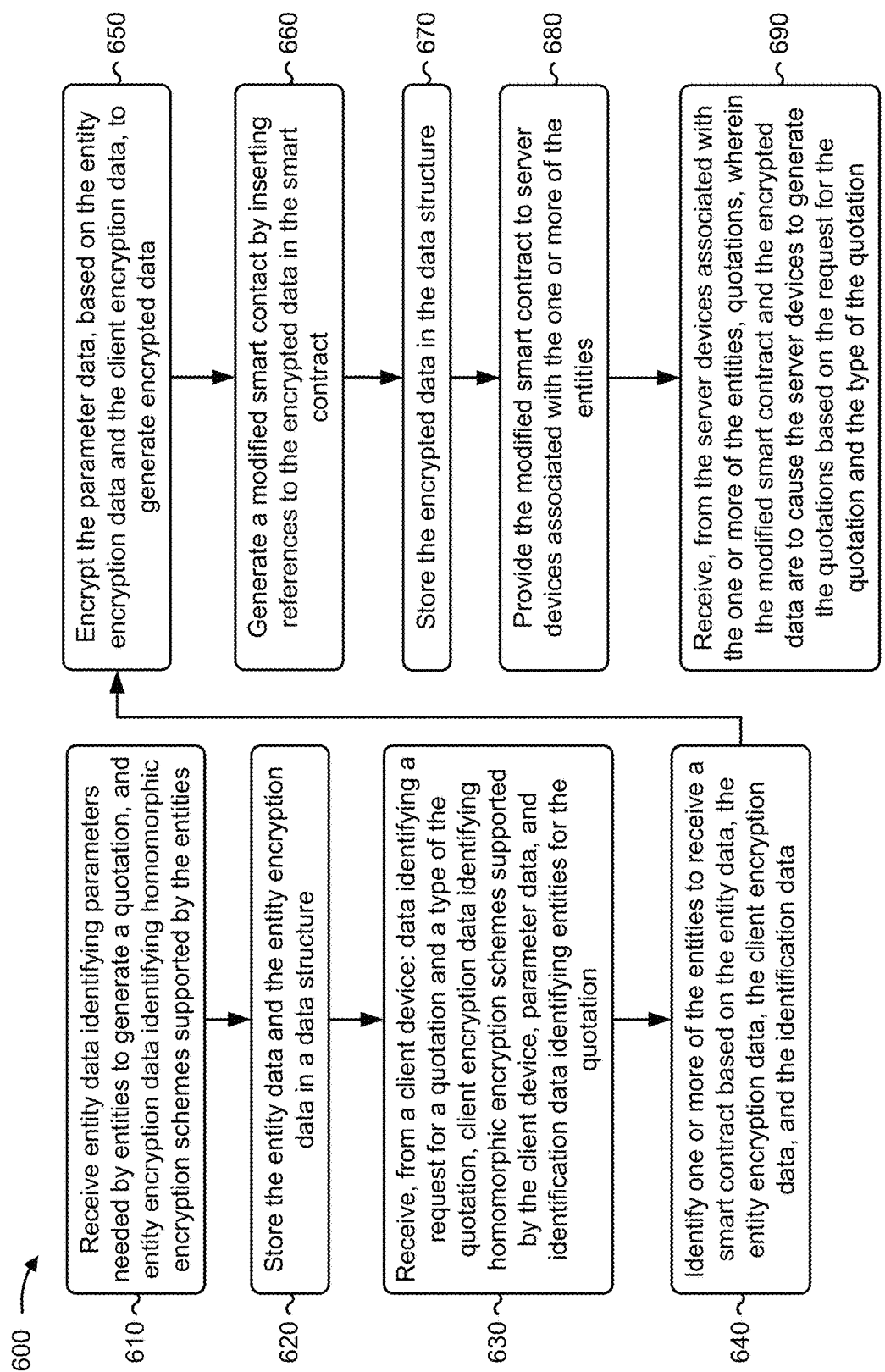

SYSTEMS AND METHODS FOR SECURE REQUESTS FOR QUOTATIONS

BACKGROUND

Homomorphic encryption is a form of encryption that allows computation on encrypted data. Performing a computation on homomorphic encrypted data generates an encrypted result that, when decrypted, matches a result of performing the same computation on an unencrypted form of the data.

SUMMARY

According to some implementations, a method may include receiving, by a device, entity data identifying parameters needed by entities to generate a quotation, and entity encryption data identifying homomorphic encryption schemes supported by the entities; storing, by the device, the entity data and the entity encryption data in a data structure; receiving, by the device and from a client device: a smart contract that includes data identifying a request for a quotation and a type of the quotation, client encryption data identifying homomorphic encryption schemes supported by the client device, and identification data identifying entities for the quotation; identifying, by the device, one or more of the entities to receive the smart contract based on the entity data, the entity encryption data, the client encryption data, and the identification data; encrypting, by the device, the data included in the smart contract, based on the entity encryption data and the client encryption data, to generate encrypted data; generating, by the device, a modified smart contact by replacing the data included in the smart contract with references to the encrypted data; storing, by the device, the encrypted data in the data structure; providing, by the device, the modified smart contract to server devices associated with the one or more of the entities; and receiving, by the device and from the server devices associated with the one or more of the entities, the modified smart contract with quotations, wherein the modified smart contract and the encrypted data are to cause the server devices to generate the quotations based on the request for the quotation and the type of the quotation.

According to some implementations, a device may include one or more memories and one or more processors. In some implementations, the one or more processors are communicatively coupled to the one or more memories. The one or more processors may be configured to: receive entity data identifying parameters needed by entities to generate a quotation, and entity encryption data identifying homomorphic encryption schemes supported by the entities; store the entity data and the entity encryption data in a data structure; receive, from a client device: a smart contract that includes data identifying a request for a quotation and a type of the quotation, client encryption data identifying homomorphic encryption schemes supported by the client device, and identification data identifying entities for the quotation; identify one or more of the entities to receive the smart contract based on the entity data, the entity encryption data, the client encryption data, and the identification data; encrypt the data included in the smart contract, based on the entity encryption data and the client encryption data, to generate encrypted data; generate a modified smart contact by replacing the data included in the smart contract with references to the encrypted data; store the encrypted data in the data structure; provide the modified smart contract to server devices associated with the one or more of the entities; receive, from the server devices associated with the one or more of the entities, the modified smart contract with quotations, wherein the modified smart contract and the encrypted data are to cause the server devices to generate the quotations based on the request for the quotation and the type of the quotation; encrypt the quotations in the modified smart contract, based on the entity encryption data and the client encryption data, to generated encrypted quotations; replace the quotations in the modified smart contract with references to the encrypted quotations; store the encrypted quotations in the data structure; and provide, to the client device, the modified smart contract with the references to the encrypted quotations.

According to some implementations, a non-transitory computer-readable medium may store one or more instructions. The one or more instructions, when executed by one or more processors of a device, may cause the one or more processors to: receive entity data identifying parameters needed by entities to generate a quotation, and entity encryption data identifying homomorphic encryption schemes supported by the entities; store the entity data and the entity encryption data in a data structure; receive, from a client device: a smart contract that includes data identifying a request for a quotation and a type of the quotation, client encryption data identifying homomorphic encryption schemes supported by the client device, and identification data identifying entities for the quotation; identify one or more of the entities to receive the smart contract based on the entity data, the entity encryption data, the client encryption data, and the identification data; encrypt the data included in the smart contract, based on the entity encryption data and the client encryption data, to generate encrypted data; generate a modified smart contact by replacing the data included in the smart contract with references to the encrypted data; store the encrypted data in the data structure; provide the modified smart contract to server devices associated with the one or more of the entities; receive, from the server devices associated with the one or more of the entities, the modified smart contract with quotations, wherein the modified smart contract and the encrypted data are to cause the server devices to generate the quotations based on the request for the quotation and the type of the quotation.

BRIEF DESCRIPTION OF THE DRAWINGS

FIGS. 4-6 are flow charts of example processes relating to secure requests for quotations.

DETAILED DESCRIPTION

Figure 1A:
FIGS. 1A-1M are diagrams of an example implementation described herein.

The following detailed description of example implementations refers to the accompanying drawings. The same reference numbers in different drawings may identify the same or similar elements.

A user (e.g., a person, a company, an organization, a robot, an autonomous vehicle, and/or the like) may desire to purchase an item (e.g., a product, a service, a performance of a task, and/or the like). The user may utilize a search engine to identify an entity (e.g., a person, a company, an organization, a robot, an autonomous vehicle, and/or the like) from which the item may be obtained. For example, the user may determine one or more search terms related to the item.

The user may input the one or more search terms into the search engine to obtain a list of search results. The user may review the list of search results to identify an entity from which the item may be obtained. In some cases, the user may be unfamiliar with the item and utilize search terms that are too general, too narrow, incorrect, and/or the like. In these cases, the user may have to perform multiple searches to identify an entity from which the item may be obtained thereby causing the user to utilize additional time and computing resources (e.g., processing resources, memory resources, communication resources, and/or the like) to identify the entity.

Once the user has identified the entity, the user may contact the entity by providing a request for a quotation associated with the entity providing the item to the user. For example, the list of search results may include a link to a website associated with the entity. The user may click on the link to access the website. The website may include an email address of a sales department of the entity. The user may utilize the email address to send an email to the sales department requesting a quotation associated with the entity providing the item.

The email may include information related to the entity providing the item to the user. For example, the email may include information identifying the item, information identifying the user, information identifying an address associated with the user, and/or the like. Commonly, to ensure that the entity is able to access the information included in the email, the information is not encrypted or protected. Sending the information to the entity in clear text (e.g., unencrypted) may increase a security risk associated with the information being stolen, changed, corrupted, and/or the like. Further, compliance with certain regulations (e.g., General Data Protection Regulation (GDPR)) may require the information to be sent in an encrypted format.

In some cases, the user may not include one or more items of information required by the entity to generate the quotation. In these cases, the entity may respond to the user's email with a list of additional information needed by the entity to generate the quotation. By not including all of the required information in the email, the entity may be required to utilize additional computing resources to generate and/or transmit a response requesting the additional information.

The user may obtain the additional information and provide the additional information to the entity. The entity may receive the additional information and may generate a quotation associated with providing the item to the user. The entity may provide the quotation to the user.

The user may repeat the above-described process to obtain multiple quotations from multiple entities. The user may review the terms of the quotations and may select one of the entities to provide the item to the user. The user may contact the selected entity and the user and the selected entity may negotiate a set of terms related to the entity providing the item to the user. Upon successfully negotiating the set of terms, the entity may provide the item to the user based thereon.

Some implementations described herein may relate to a quotation system that enables a user to submit secure requests for quotations to entities and to receive secure quotations from the entities. For example, the quotation system may obtain entity information and encryption information from a plurality of entities. The entity information obtained from an entity may include information identifying a type of quotation associated with the entity (e.g., a car insurance quotation, a purchase order quotation, a quotation for constructing a building, a quotation for performing a home repair, and/or the like), information required by the entity to generate a quotation for the type of item, and/or the like. The encryption information may include information identifying one or more types of encryption that the entity is able to utilize.

The quotation system may enable a user wishing to receive a quotation for an item to view a list of types of quotations associated with the item. The user may select a type of quotation relating to the item from the list of types of quotations. The quotation system may identify a group of entities associated with the selected type of quotation based on entity information obtained from the plurality of entities. In this way, the quotation system may conserve computing resources that would otherwise be utilized by the user to perform one or more internet searches to identify the group of entities.

The quotation system may determine information required for the group of entities to generate the quotation based on the entity information obtained from the group of entities. The quotation system may request the information from the user. The user may obtain the requested information and input the information into the quotation system. In this way, the quotation system may conserve computing resources that would otherwise be utilized to request and/or provide additional information to the entities.

The quotation system may determine a type of encryption utilized by the group of entities based on the encryption information obtained from the group of entities. The quotation system may utilize the type of encryption to encrypt the information input by the user and may provide the encrypted information to the group of entities. In this way, the information input by the user can be securely transmitted to the group of entities.

In some implementations, the quotation system may store the encrypted information in a data structure and may provide a reference to the stored encrypted information to the group of entities. By providing a reference to the stored encrypted information, rather than the encrypted information, a size of the information provided to the group of entities may be reduced. A reduction in the size of the information provided to the group of entities, may enable the quotation system to conserve computing resources that would otherwise be utilized to provide the encrypted information to the group of entities.

FIGS. 1A-1M are diagrams of one or more examples 100 associated with systems and methods for enabling a secure request for a quotation. As shown in FIGS. 1A-1M, the one or more examples 100 includes a quotation system, a client device associated with a user, and server devices associated with entities. The quotation system may provide a quotation service that enables the entities to receive, via the server devices, a request for a quotation from a user and/or enables the entities to provide a quotation to a user, via the client device, in a secure manner.

In some implementations, the quotation system may obtain information associated with providing a quotation from a plurality of entities. As shown in FIG. 1A, and by reference number 105, the quotation system receives, from server devices associated with the plurality of entities (e.g., Entities A, B, and C, as shown in FIG. 1A), entity data identifying parameters needed by entities to generate a quotation and entity encryption data identifying homomorphic encryption schemes supported by the entities.

The parameters identified by entity data obtained from an entity may include parameters utilized by the entity to calculate a cost associated with providing an item to a user and/or to generate a quotation associated with providing the item to the user. For example, the entity may be an insurance company that provides insurance policies for vehicles and the parameters identified by the entity data may include parameters associated with computing a cost associated with providing an insurance policy for a particular vehicle to a particular user. In this example, the parameters may include a parameter associated with a type of the vehicle (e.g., a car, a truck, a motorcycle, and/or the like), a parameter associated with a make and/or model of the vehicle, a parameter associated with a mileage of the vehicle, a parameter associated with an age of a driver of the vehicle, and/or the like. The above-listed parameters are intended to be merely examples of types of parameters that may be used. In practice, the parameters may include any one or more of the above-listed parameters and/or one or more other types of parameters not listed above.

As shown in FIG. 1A, the entity data obtained from a server device associated with Entity A includes Parameters A. The entity data obtained from a server device associated with Entity B includes Parameters B. The entity data obtained from a server device associated with Entity C includes Parameters C.

In some implementations, the entity data may include additional information. For example, the entity data obtained from a server device associated with an entity may include information identifying the entity, information identifying a type of quotation associated with the entity, information identifying a product or service associated with the entity, and/or the like.

The entity encryption data may include information identifying one or more types of homomorphic encryption utilized by the server devices. For example, the entity encryption data obtained from a server device associated with an entity may include information identifying one or more types of homomorphic encryption utilized by the server device, such as partially homomorphic encryption, somewhat homomorphic encryption, leveled fully homomorphic encryption, fully homomorphic encryption, and/or the like. Alternatively, and/or additionally, the entity encryption data obtained from the server may include information identifying other types of encryption utilized by the server device, such as advanced encryption standard (AES) encryption, data encryption standard (DES) encryption, Rivest-Shamir-Aldleman (RSA) encryption, and/or the like.

As shown in FIG. 1A, the entity encryption data obtained from the server device associated with Entity A includes information identifying a second type of homomorphic encryption scheme and a third type of homomorphic encryption scheme (shown as Type 2 and 3, in FIG. 1A). The entity encryption data obtained from the server device associated with Entity B includes information identifying a first type of homomorphic encryption scheme, the second type of homomorphic encryption scheme, and the third type of homomorphic encryption scheme (shown as Type 1, 2, and 3, in FIG. 1A). The entity encryption data obtained from the server device associated with Entity C includes information identifying the first type of homomorphic encryption scheme (shown as Type 1, in FIG. 1A).

In some implementations, the quotation system may receive the entity data and/or the entity encryption data as part of a registration process. For example, the quotation system may provide a quotation service that provides secure requests for quotations received from users to entities registered with the quotation service. The entity may register with the quotation service and may provide the entity data and/or the entity encryption data to the quotation system based on registering with the quotation service.

In some implementations, the entity may provide the entity data and/or the entity encryption data based on a user selecting a particular type of request for quotation. For example, user may use a client device to provide information identifying a type of quotation, as described below with respect to FIG. 1B. The entity may determine that the user provided the information identifying the particular type of quotation and may provide the entity information and/or the entity encryption information based thereon.

In some implementations, the entity may determine that the user provided the information identifying the particular type of quotation based on a notification provided to the entity by the quotation system. The quotation system may receive the information from the client device and may identify one or more entities associated with the type of quotation.

In some implementations, the quotation system identifies the one or more entities based on information stored in a memory associated with the quotation system. For example, the quotation system may access a data structure storing information associating entities with types of quotations. The quotation system may identify the one or more entities associated with the type of quotation based on the information stored in the data structure.

The quotation system may transmit a notification to a server device associated with the entity indicating that the client device provided the information identifying the particular type of request for quotation. The server devices may receive the notification and may transmit the entity information and/or the entity encryption information to the quotation system based on the notification.

The quotation system may receive the entity data and/or the entity encryption data from the server devices. In some implementations, the quotation system and/or the server devices append or otherwise associate the entity data and/or the entity encryption data to a request for quotation corresponding to the particular type of request for quotation identified by the information received from the client device. Alternatively, and/or additionally, the quotation system may store the entity data and/or the entity encryption data in a memory associated with the quotation system. As shown by reference number 110, the quotation system stores the entity data and the entity encryption data in a data structure.

In some implementations, the entity information received from a server device associated with an entity includes information identifying a type of product or service associated with the entity and a type of quotation associated with the entity. The quotation system may determine that the item corresponds to the type of product or service associated with the entity. The quotation system may determine that the item is associated with the type of quotation identified by the entity data based on the item corresponding to the type of product or service associated with the entity. The quotation system may cause the user interface to display information identifying the type of quotation based on the item being associated with the type of quotation. The user may select the type of quotation via the user interface.

The selected type of quotation may be associated with one or more homomorphic encryption schemes. In some implementations, the selected type of quotation is associated with a default set of homomorphic encryption schemes. The default set of homomorphic encryption schemes may include a group of homomorphic encryption schemes supported by the quotation system. In some implementations, the group of homomorphic encryption schemes includes each homomorphic encryption scheme that is supported by the quotation system.

In some implementations, the group of homomorphic encryption schemes includes a group of most frequently used homomorphic encryption schemes. For example, the quotation system may determine a quantity of times each homomorphic encryption scheme supported by the quotation system has been utilized by a client and/or an entity. The quotation system may determine the group of most frequently used homomorphic encryption schemes based on the quantity of times each homomorphic encryption scheme has been utilized by a client and/or an entity.

In some implementations, the group of homomorphic encryption schemes includes homomorphic encryption schemes identified by the entity encryption information obtained from servers associated with entities associated with the selected type of quotation. The quotation system may determine a group of entities associated with the selected type of quotation. The quotation system may obtain entity encryption information associated with the group of entities from the data structure. The quotation system may identify the homomorphic encryption schemes identified in the entity encryption information associated with the group of entities.

In some implementations, the user may input information identifying one or more homomorphic encryption schemes associated with the type of quotation. For example, the user interface may display a list of homomorphic encryption schemes and the user may select one or more homomorphic encryption schemes from the list.

In some implementations, the list includes the default list of homomorphic encryption schemes. The user may select one or more homomorphic encryption schemes from the list. The quotation system may associate the type of quotation with the selected one or more homomorphic encryption schemes. Alternatively, and/or additionally, the user may input information indicating a homomorphic encryption scheme is to be removed from the set of default homomorphic encryption schemes associated with the type of quotation. The quotation system may cause the homomorphic encryption scheme to be removed from the default set of homomorphic encryption schemes based on the input information.

In some implementations, the quotation system determines one or more parameters associated with the selected type of quotation. The quotation system may determine the one or more parameters based on entity information stored in the data structure. The data structure may store information associating types of quotations with entities. The quotation system may query the data structure to obtain information identifying the entities associated with the selected type of quotation.

The quotation system may obtain the entity information received from servers associated with the identified entities. The entity information may identify parameters needed by the identified entities to generate the selected type of quotation. The quotation system may determine the one or more parameters associated with the selected type of contract based on the parameters needed by the identified entities.

The quotation system may provide information identifying the one or more parameters to the client device to cause the user interface to display the information identifying the one or more parameters. The user may input values for the one or more parameters via the user interface. For example, the type of quotation may be a life insurance quotation and the one or more parameters may include a parameter associated with an age of the user and the user may insert information identifying the age of the user (e.g., a numerical value corresponding to the age of the user) via the user interface.

In some implementations, the user may provide information identifying one or more entities to which the request for quotation is to be provided. For example, the quotation system may provide information identifying the entities associated with the type of quotation to the client device to cause the user interface to display a list of entities to which the request for quotation may be sent. The user may select one or more entities from the list of entities.

In some implementations, the user selects the one or more entities based on historical quotation data associated with entities associated with the type of quotation. The historical quotation data associated with an entity may include information indicating a quantity of times the entity was provided a request for quotation, a quantity of times a response provided by the entity was selected, survey information associated with the user (e.g., ratings provided by users based on conducting a transaction with the entity and/or the like), and/or the like.

In some implementations, the client device generates a smart contract associated with the type of quotation based on the type of quotation, the homomorphic encryption schemes associated with the type of quotation, the one or more parameters associated with the type of quotation, and/or the entities associated with the type of quotation. The smart contract may be a data structure that enables a secure request for quotation to be transmitted to the entities associated with the type of quotation, as described in greater detail below.

In some implementations, the client device may obtain an application for generating the smart contract from the quotation system. Alternatively, and/or additionally, the application may be provided via a cloud computing platform associated with the quotation system. The client device may utilize the application to generate the smart contract and may provide the smart contract to the quotation system.

Figure 1B:
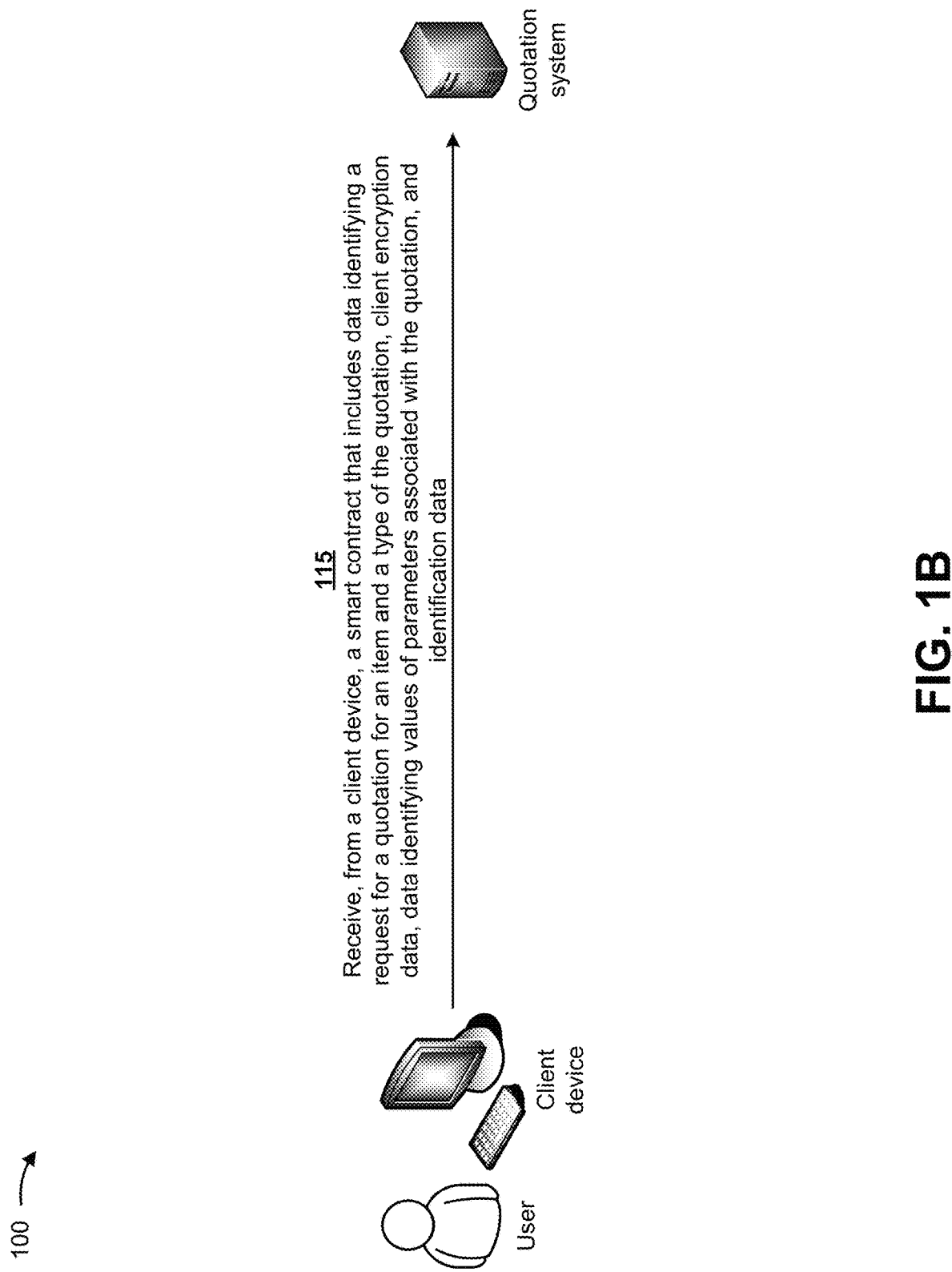

As shown in FIG. 1B, and by reference number 115, the quotation system receives, from a client device, a smart contract that includes data identifying a request for a quotation for an item and a type of the quotation, client encryption data, and identification data. The client encryption data may include information identifying homomorphic encryption schemes supported by the client device. The identification data may include information identifying the client device, information identifying a user of the client device, and/or information identifying entities selected by the user to receive the request for quotation.

In some implementations, the client device may encrypt one or more portions of the values of the parameters. For example, the client device may obtain a public key of a public key/private key key pair associated with the quotation system to encrypt the values of the parameters. The client device may transmit the encrypted values of the parameters to the quotation system. The quotation system may receive the encrypted values of the parameters and may utilize the private key of the public key/private key key pair associated with the quotation system to decrypt the values of the parameters.

Figure 1C:
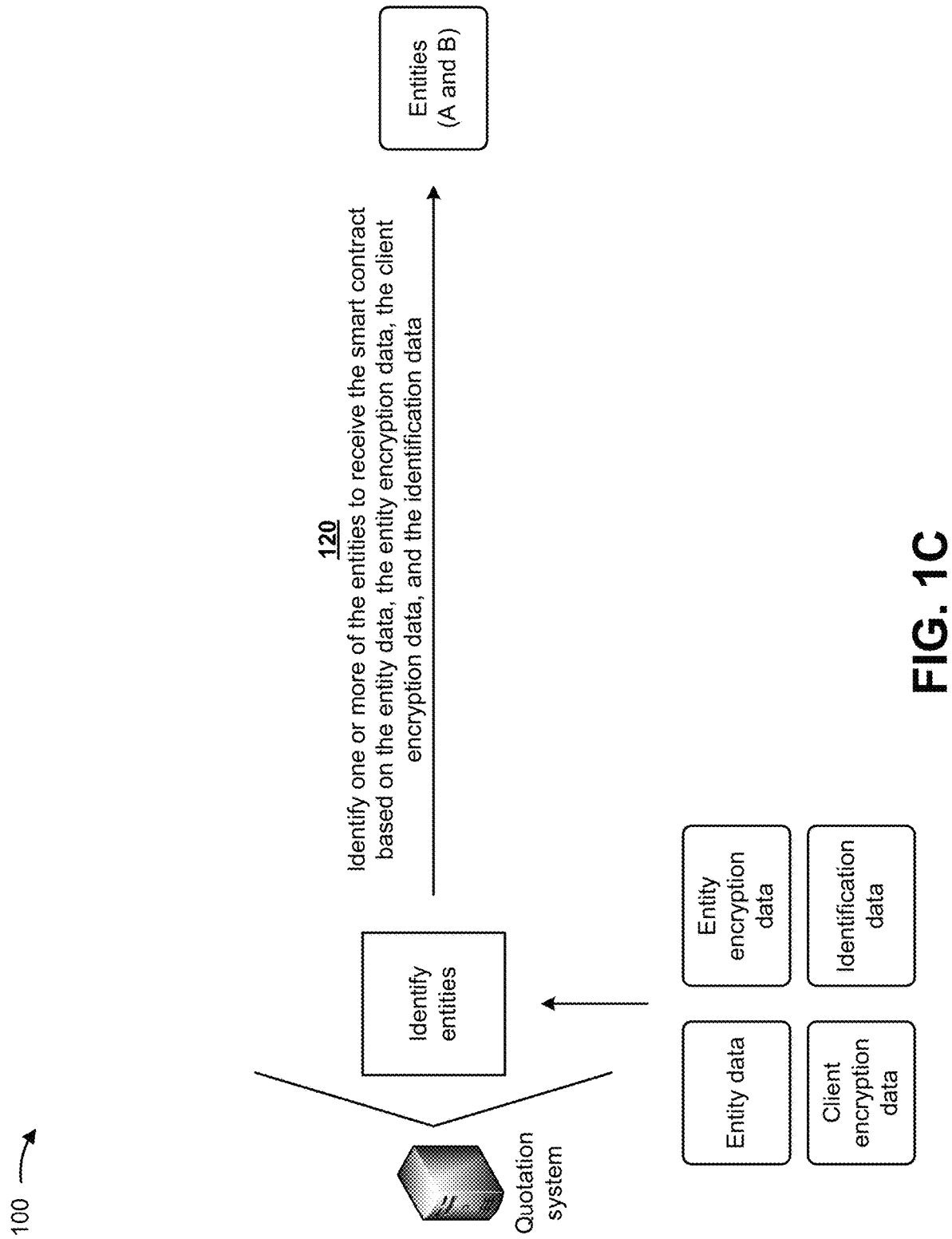

As shown in FIG. 1C, and by reference number 120, the quotation system identifies one or more of the entities to receive the smart contract based on the entity data, the entity encryption data, the client encryption data, and the identification data. The one or more entities may be one or more of the entities identified by the identification data included in the smart contract that are able to support a homomorphic encryption scheme associated with the smart contract.

In some implementations, the quotation system may identify one or more entities that support at least one type of homomorphic encryption identified by the client encryption data to receive the smart contract. For example, the quotation system may determine a set of homomorphic encryption schemes that an entity identified by the identification data is able to support based on the entity encryption information received from a server device associated with the entity. The quotation system may determine whether the set of homomorphic encryption schemes that the entity is able to support includes at least one homomorphic encryption scheme identified by the client encryption data. The quotation system may determine that the entity is to receive the smart contract when the set of homomorphic encryption schemes that the entity is able to support includes at least one homomorphic encryption scheme identified by the client encryption data.

In some implementations, the quotation system may identify one or more entities that support a same type of homomorphic encryption identified by the client encryption data to receive the smart contract. For example, the quotation system may determine a set of homomorphic encryption schemes that an entity identified by the identification data is able to support based on the entity encryption information received from a server device associated with the entity. The quotation system may determine whether the set of homomorphic encryption schemes that the entity is able to support includes a particular homomorphic encryption scheme identified by the client encryption data. The quotation system may determine that the entity is to receive the smart contract when the set of homomorphic encryption schemes that the entity is able to support includes the particular homomorphic encryption scheme identified by the client encryption data.

In some implementations, when the set of homomorphic encryption schemes that the entity is able to support does not include at least one homomorphic encryption scheme and/or the particular homomorphic encryption scheme identified by the client encryption data, the quotation system may provide, to the client device, data (e.g., a homomorphic encryption algorithm) to enable the client device to utilize a homomorphic encryption scheme supported by the entity. The quotation system may determine that the entity is to receive the smart contract based on providing the data (e.g., the homomorphic encryption algorithm) to the client device.

Alternatively, and/or additionally, the quotation system may provide, to the server device associated with the entity, data to enable the server device to utilize a homomorphic encryption scheme identified by the client encryption data. The quotation system may determine that the entity is to receive the smart contract based on providing the data (e.g., the homomorphic encryption scheme) to the server device.

Figure 1D:
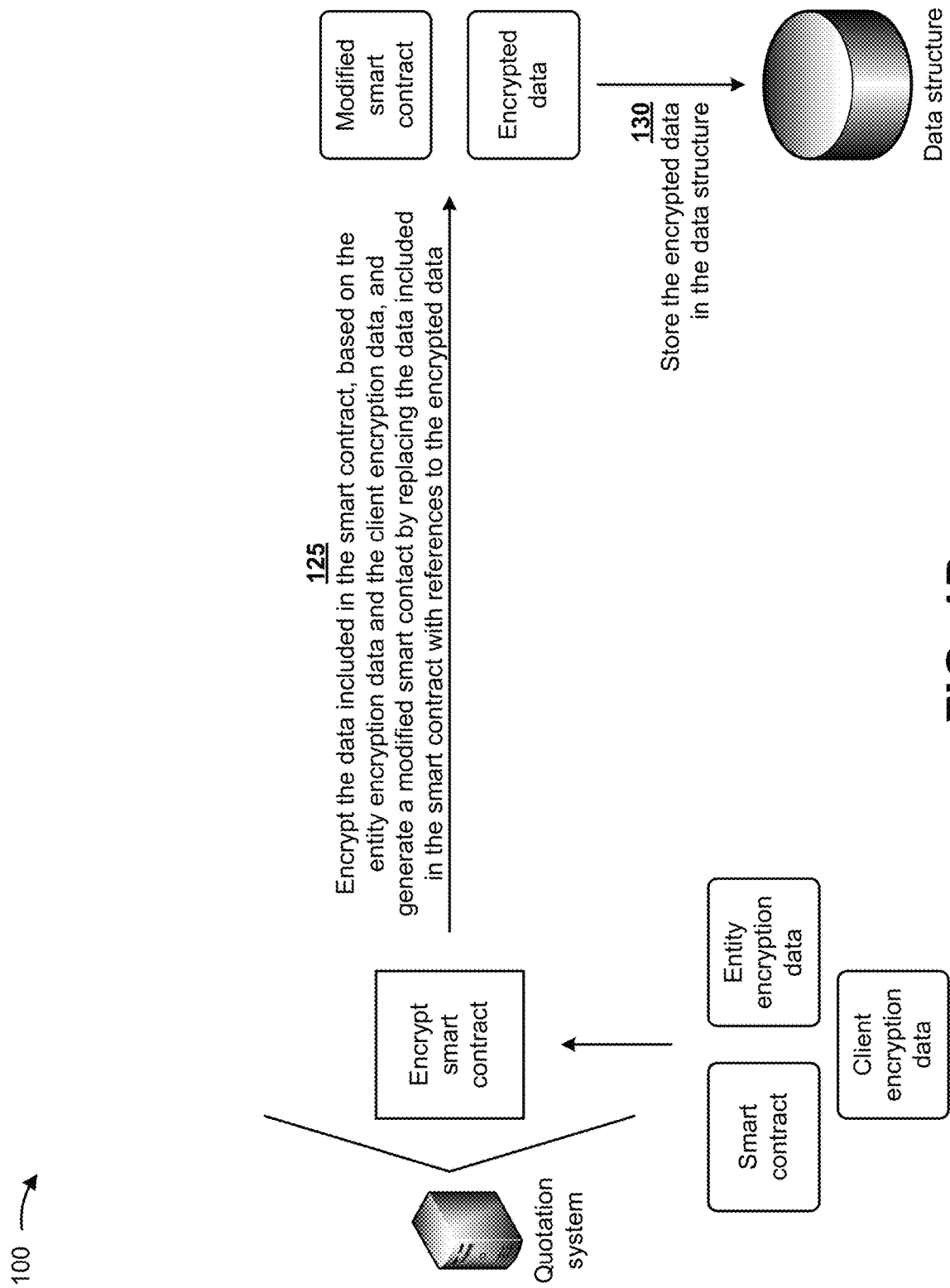

As shown in FIG. 1D, and by reference number 125, the quotation system encrypts the data included in the smart contract, based on the entity encryption data and the client encryption data, and generates a modified smart contract by replacing the data included in the smart contract with references to the encrypted data. For example, the quotation system may extract the data identifying values of the parameters associated with the quotation and/or the identification data from the smart contract. The quotation system may utilize a homomorphic encryption scheme to encrypt the data identifying the values of the parameters and/or the identification data.

In some implementations, the quotation system utilizes a single type of homomorphic encryption scheme to encrypt the data identifying the values of the parameters and/or the identification data. For example, the one or more entities identified by the quotation system to receive the smart contract may support a particular type of homomorphic encryption scheme identified in the client encryption data. The quotation system may utilize the particular type of homomorphic encryption scheme to encrypt the data identifying the values of the parameters and/or the identification data.

In some implementations, the quotation system utilizes multiple homomorphic encryption schemes to encrypt the data identifying the values of the parameters and/or the identification data. For example, the one or more entities identified by the quotation system to receive the smart contract may include a first entity and a second entity. The quotation system may determine that the entity encryption information obtained from a server device associated with the first entity identifies a first homomorphic encryption scheme identified by the client encryption data. The quotation system may determine that the entity encryption information obtained from a server device associated with the second entity identifies a second, different homomorphic encryption scheme identified by the client encryption data.

The quotation system may utilize the first homomorphic encryption scheme to encrypt the data identifying the values of the parameters and/or the identification data to generate a first set of encrypted data for the first entity. The quotation system may generate a copy of the data identifying the values of the parameters and/or the identification data. The quotation system may utilize the second homomorphic encryption scheme to encrypt the copy of the data identifying the values of the parameters and/or the identification data to generate a second set of encrypted data for the second entity.

As shown by reference number 130, the quotation system stores the encrypted data in the data structure. The quotation system may generate a modified smart contract by replacing the data identifying the values of the parameters and/or the identification data with references to the encrypted data in the data structure. The references to the encrypted data may include information for obtaining the encrypted data from the data structure. For example, the references may include information identifying a memory address of an off chain storage device in which the data structure is stored.

In some implementations, the client device utilizes a homomorphic encryption scheme to encrypt the data identifying the values of the parameters and/or the identification data. The client device may store the encrypted data in an off-chain storage associated with the quotation system (e.g., the data structure). The client device may provide a reference to the stored encrypted data to the quotation system. The quotation system may generate the modified smart contract by inserting the reference in the smart contract.

Figure 1E:
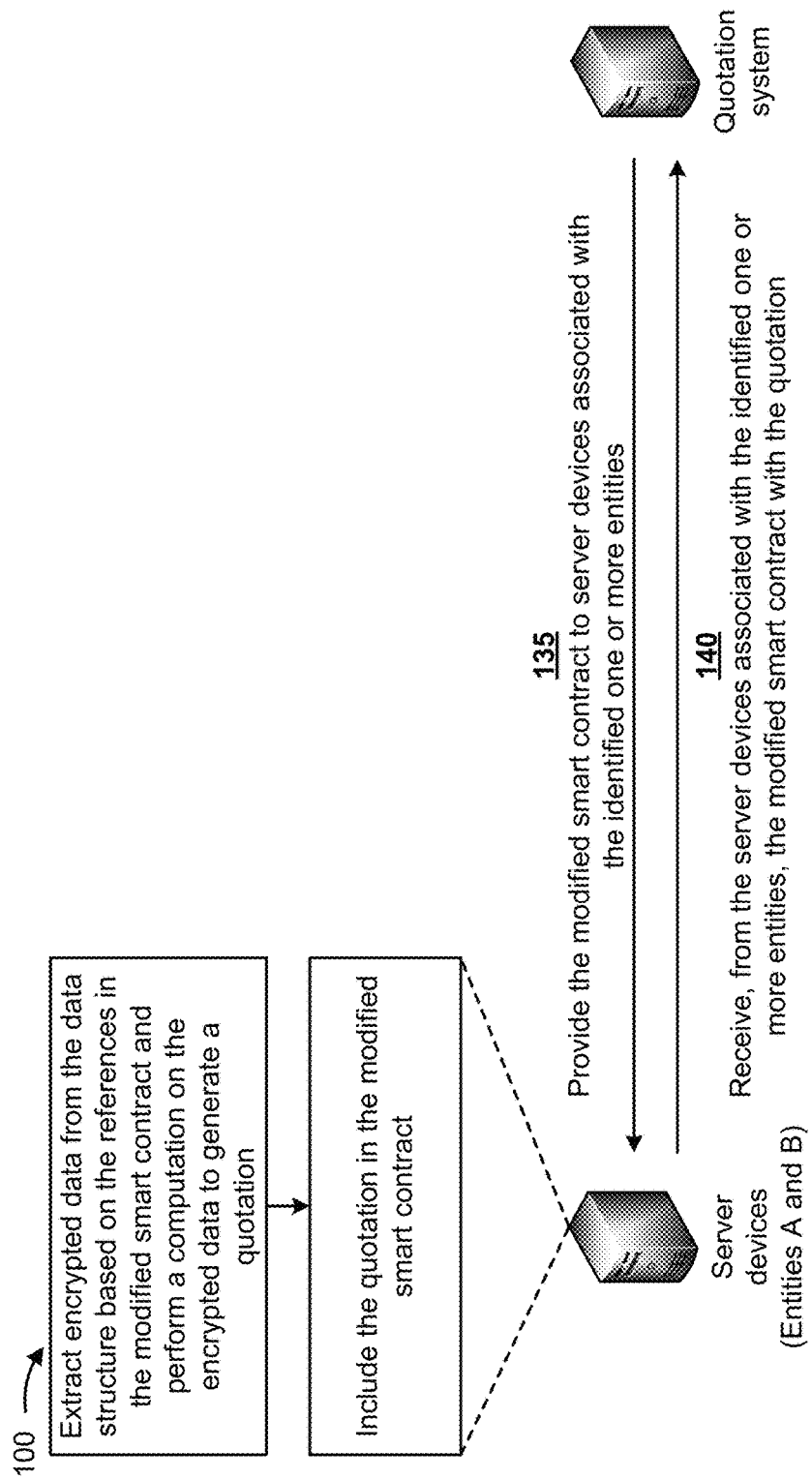

As shown in FIG. 1E, and by reference number 135, the quotation system provides the modified smart contract to server devices associated with the identified one or more entities. In some implementations, the server devices generate quotations based on the modified smart contract. For example, as shown in FIG. 1E, a server device (e.g., a server device associated with entity A and/or a server device associated with entity B) extracts encrypted data from the data structured based on the references in the modified smart contract and performs a computation on the encrypted data to generate a quotation.

As shown in FIG. 1E, the server device includes the quotation in the modified smart contract. The server device provides the modified smart contract, including the quotation, to the quotation system. As shown by reference number

140, the quotation system receives, from the server devices associated with the identified one or more entities, the modified smart contract with the quotations.

In some implementations, the server device provides a reference to the quotation to the quotation system. The server device may store the quotation in the off-chain storage associated with the quotation system. The server device may provide a reference to the stored quotation to the quotation system. The quotation system may receive the reference from the server device and may insert the reference into the smart contract.

Figure 1F:
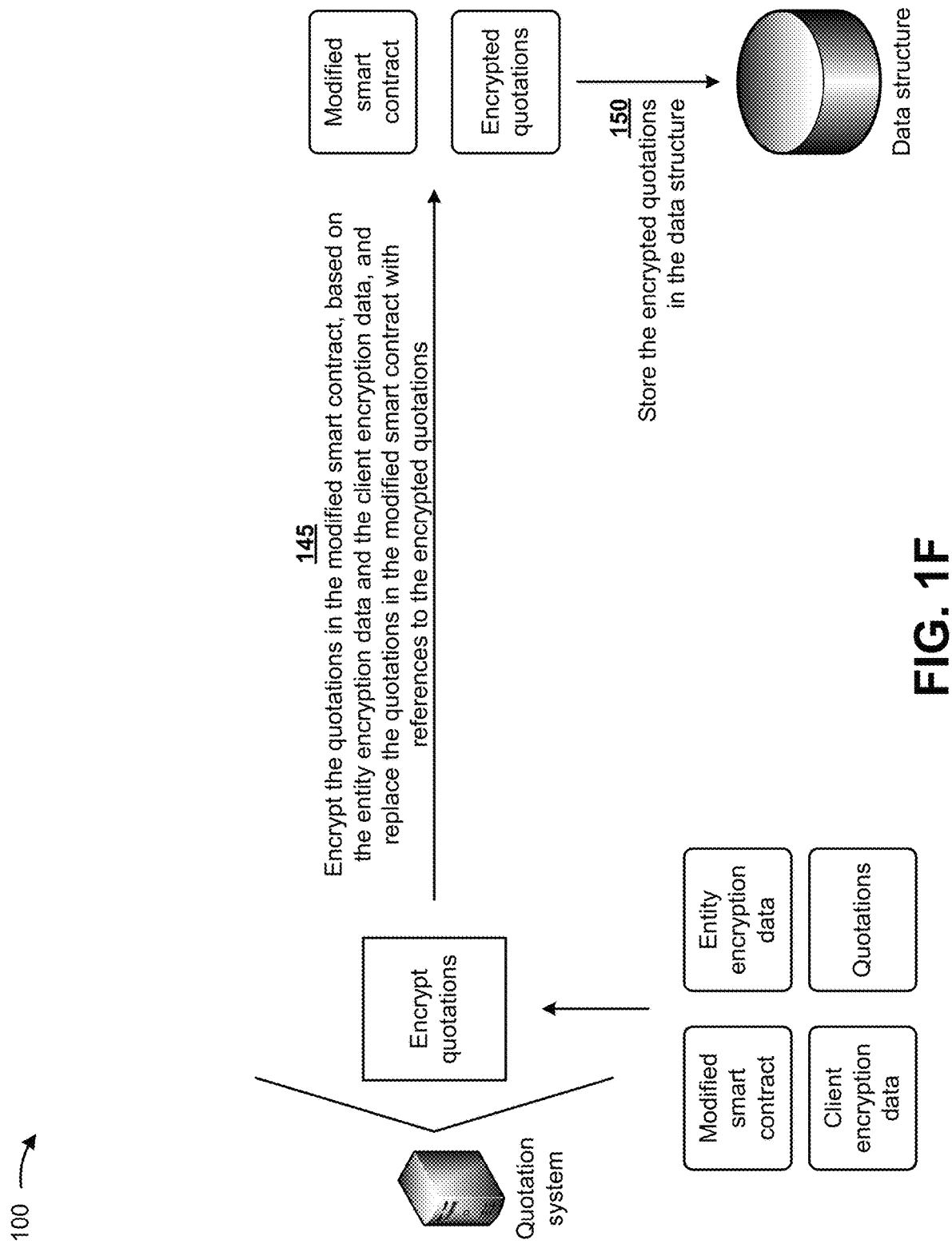

As shown in FIG. 1F, and by reference number 145, the quotation system encrypts the quotations, based on the entity encryption data and the client encryption data, and replaces the quotations in the modified smart contract with references to the encrypted quotations. The quotation system may utilize a type of homomorphic encryption scheme identified by the client encryption data to encrypt the quotations. In some implementations, the quotation system may utilize the type of homomorphic encryption scheme utilized to encrypt the data included in the smart contract to encrypt the quotations. In some implementations, the quotation system may utilize a different type of homomorphic encryption scheme to encrypt the quotations.

As shown by reference number 150, the quotation system stores the encrypted quotations in the data structure. For example, the quotation system may replace the quotations in the modified smart contract with references to the encrypted quotations based on storing the encrypted quotations in the data structure.

Figure 1G:
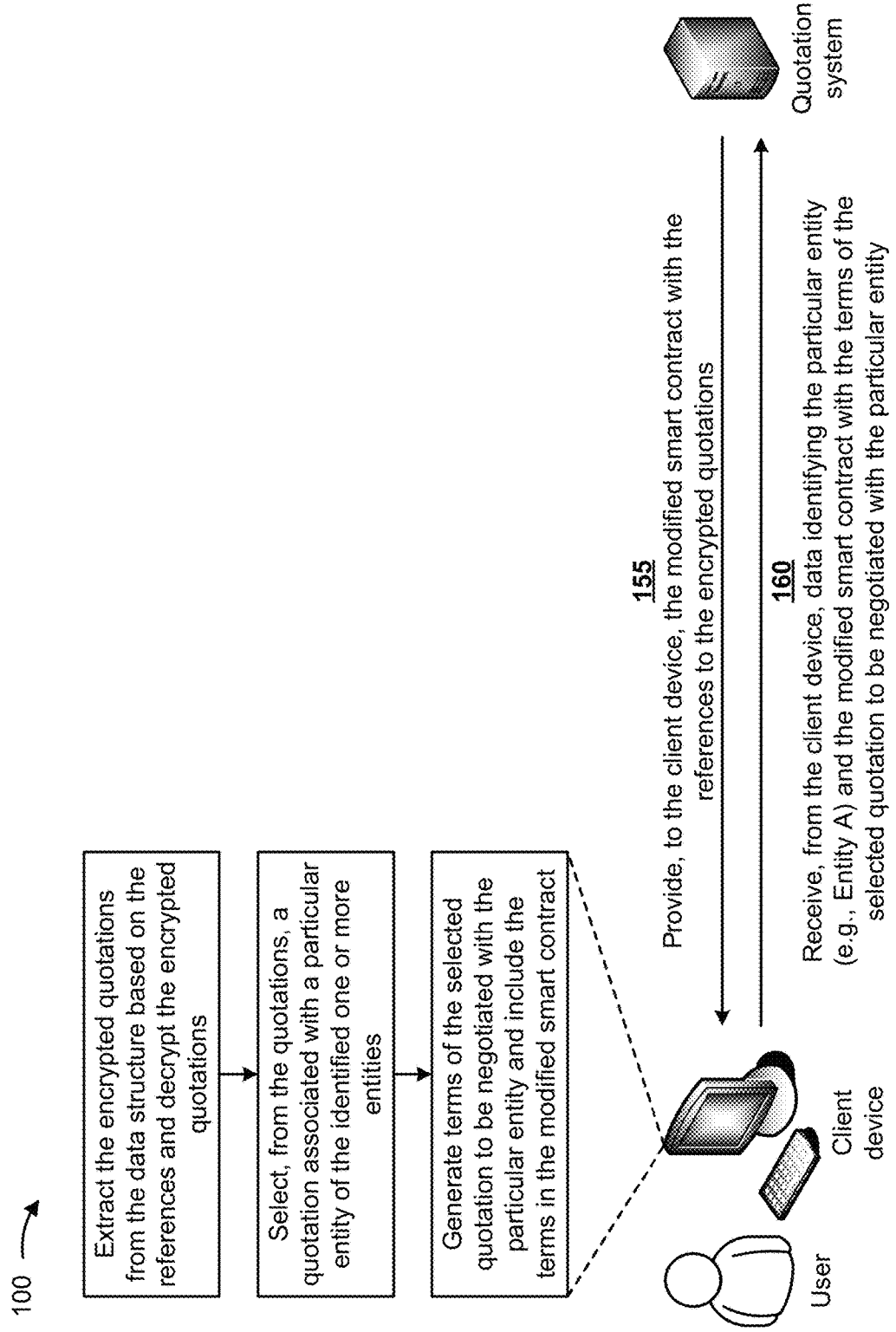

As shown in FIG. 1G, and by reference number 155, the quotation system provides, to the client device, the modified smart contract with the references to the encrypted quotations. The client device may receive the modified smart contract and may provide, via the user interface, one or more portions of the smart contract for display to the user.

For example, as shown in FIG. 1G, the client device extracts the encrypted quotations from the data structure based on the references and decrypts the encrypted quotations. The client device may cause the decrypted quotations and/or information identifying the entities associated with the decrypted quotations to be provided to the user. For example, the client device may cause the decrypted quotation and/or the information identifying the entities associated with the decrypted quotations to be displayed to the user via the user interface.

In some implementations, the decrypted quotations may be displayed in a particular order. In some implementations, the order in which the quotations may be displayed is based on a user setting. The quotation system may determine the user setting based on information stored in a user profile associated with the user, the client device, and/or the like. For example, the user setting may indicate that the decrypted quotations are to be displayed based on a price associated with the decrypted quotations (e.g., highest to lowest price, lowest to highest price, and/or the like), alphabetically, based on user reviews of the entities, based on a quantity of reviews associated with the entities, based on an entity rating, and/or the like. The quotation system may transmit an instruction to the client device to cause the client device to display the decrypted quotations in a particular order based on the user setting.

As shown in FIG. 1G, the user selects, from the quotations, a quotation associated with a particular entity of the identified one or more entities. For example, the user may review the quotations and may identify a quotation that includes one or more terms more favorable to the user relative to terms included in other quotations. For example, the user may identify a quotation including a price for an item that is lower than a price included in the other quotations. The user may use an input device (e.g., a mouse, a keyboard, and/or the like) to select the quotation that includes the one or more terms more favorable to the user.

In some implementations, the user may input information identifying one or more terms associated with the selected quotation to be negotiated with the particular entity associated with the selected quotation. For example, the quotation may include information identifying a range of dates associated with providing an item to the user, information identifying different shipping methods available to the entity for shipping the item to the user, and/or the like. As shown in FIG. 1G, the client device generates terms of the selected quotation (e.g., a date within the range of dates that the item is to be provided to the user, the shipping method to be utilized, and/or the like) to be negotiated with the particular entity.

In some implementations, the client device utilizes the quotation system to negotiate the terms of the selected quotation with the particular entity, as described below with respect to FIGS. 1G-1I. For example, as shown in FIG. 1G, the client device includes the terms to be negotiated in the modified smart contract and provides the modified smart contract to the quotation system. As shown by reference number 160, the quotation system receives, from the client device, data identifying the particular entity and the modified smart contract with the terms of the selected quotation to be negotiated with the particular entity.

Figure 1H:
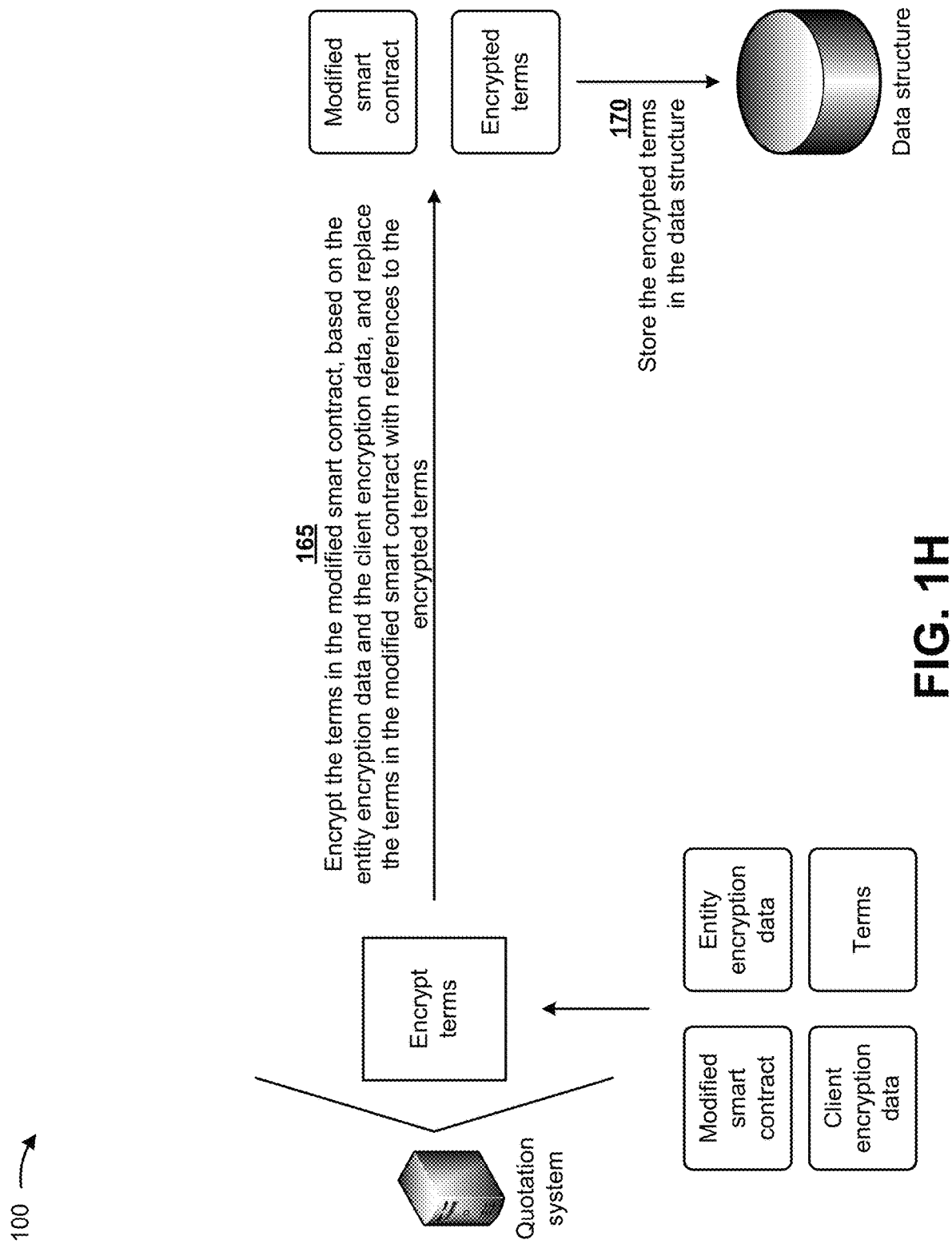

As shown in FIG. 1H, and by reference number 165, the quotation system encrypts the terms in the modified smart contract, based on the entity encryption data and the client encryption data, and replaces the terms in the modified smart contract with references to the encrypted terms. In some implementations, the quotation system encrypts the terms and replaces the terms in the modified smart contract with references to the encrypted terms in a manner similar to that described above with respect to FIG. 1D. As shown by reference number 170, the quotation system stores the encrypted terms in the data structure.

Figure 1I:
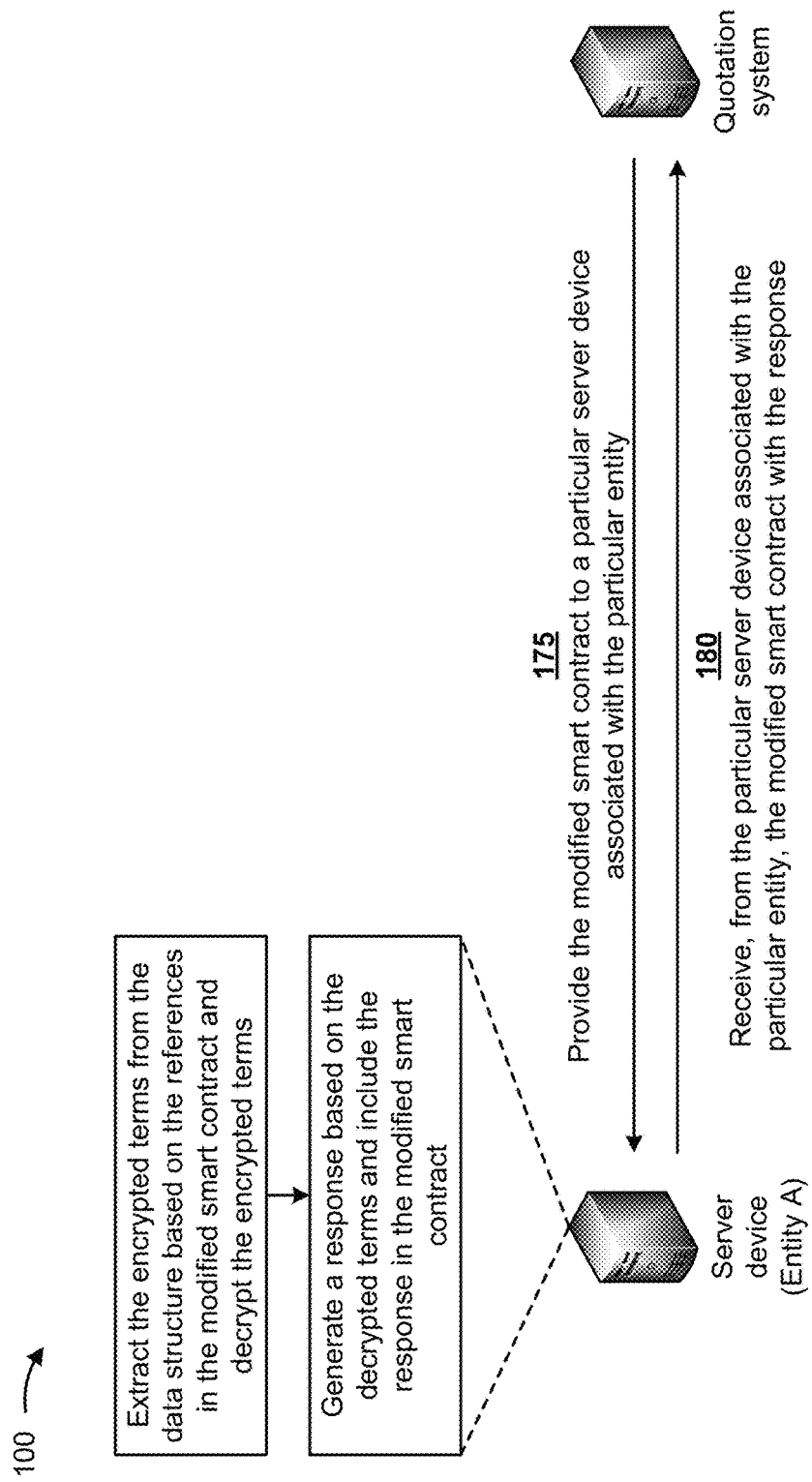

As shown in FIG. 1I, and by reference number 175, the quotation system provides the modified smart contract to a particular server device associated with the particular entity. The particular entity may receive the modified smart contract and may provide a response to the quotation system based on the modified smart contract.

As shown in FIG. 1I, the particular server device associated with the particular entity extracts the encrypted terms from the data structure based on the references in the modified smart contract and decrypts the encrypted terms. The particular server device may analyze the decrypted terms and may determine whether to negotiate the terms with the client device (e.g., the user).

As shown in FIG. 1I, the particular server device associated with the particular entity generates a response based on the decrypted terms and includes the response in the modified smart contract. In some implementations, the particular server device (e.g., the particular entity) may agree to negotiate the terms and the response may include information associated with negotiating the terms. For example, the particular server device may agree to negotiate the date the item is to be provided to the user and the response may include a proposed date for providing the item to the user.

In some implementations, the particular server device may not agree to negotiate the terms and the response may include information indicating that the terms are not negotiable and/or that the particular server does not agree to negotiate the terms.

As shown by reference number 180, the quotation system receives, from the particular server device associated with the particular entity, the modified smart contract with the response. The quotation system may provide the modified smart contract with the response to the client device. The client device may receive the modified smart contract and may provide the response for display via the user interface. The user may review the response and may provide an input to the client device to cause the client device to perform one or more actions.

In some implementations, one or more actions may include continuing to negotiate the terms with the particular entity via the quotation system. For example, the response may indicate a proposed date for providing the item to the user. The user may input information to the client device indicating a different date. The client device may generate a reply including information identifying the different date and may include the reply in the modified smart contract. The client device may transmit the modified smart contract, including the reply, to the quotation system. The quotation system may receive the smart contract including the reply and the negotiating may continue in a manner similar to that described above.

In some implementations, the one or more actions may include accepting the terms in the response. For example, the user may agree to the proposed date for providing the item to the user included in the response. The user may input information to the client device indicating that the user agrees to the proposed date. The client device may generate a reply including the information indicating that the user agrees to the proposed date and may include the reply in the smart contract. The quotation system may receive the smart contract including the reply and may provide the smart contract to the particular server device associated with the particular entity in a manner similar to that described above.

In some implementations, the one or more actions may include terminating the negotiating process with the particular entity. For example, the response may indicate that the entity will not negotiate the terms. The user may provide an input to the client device indicating that the user desires to terminate the negotiation process with the particular entity. The client device may generate a reply indicating that the user is terminating the negotiating process with the particular entity. The client device may include the reply in the smart contract and may provide the smart contract to the quotation system. The quotation system may provide the smart contract including the reply to the particular server device to terminate the negotiation session.

In some implementations, the one or more actions may include providing a second smart contract to the quotation system. For example, the user may select a second quotation associated with a second entity based on the termination of the negotiating process with the particular entity. The client device may generate a second smart contract based on the second quotation and may provide the second smart contract to the quotation system. The quotation system may receive the second smart contract, may modify the second smart contract, and may provide the modified second smart contract to the second entity in a manner similar to that described above.

Figure 1J:
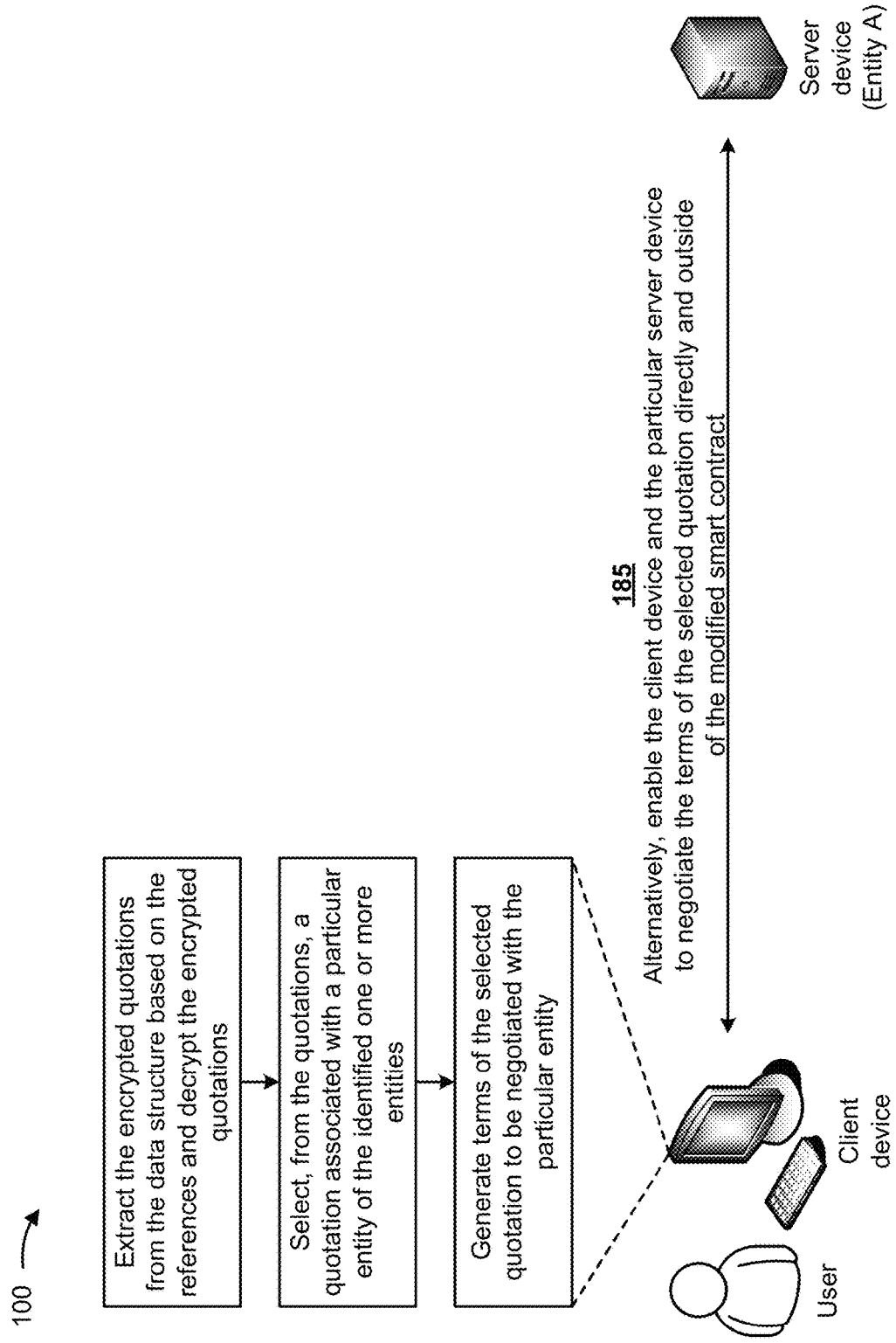

Alternatively, and/or additionally, as shown in FIG. 1J, and by reference number 185, the quotation system enables the client device and the particular server device to negotiate the terms of the selected quotation directly and outside of the modified smart contract. For example, as shown in FIG. 1J, the client device extracts the encrypted quotations from the data structure based on the references and decrypts the encrypted quotations. The client device may cause the decrypted quotations to be provided to the user. For example, the client device may cause the decrypted quotations to be displayed to the user via the user interface.

As shown in FIG. 1J, the user selects, from the quotations, a quotation associated with a particular entity of the identified one or more entities. The user may input information identifying the selected quotation and information identifying one or more terms to be negotiated to the client device. As shown in FIG. 1J, the client device generates terms of the selected quotation to be negotiated with the particular entity based on the input information. The selected quotation may include contact information for the particular entity (e.g., an IP address of the particular server, an email address, and/or the like). The client device may provide information identifying the terms of the selected quotation to the particular entity based on the contact information.

Figure 1K:
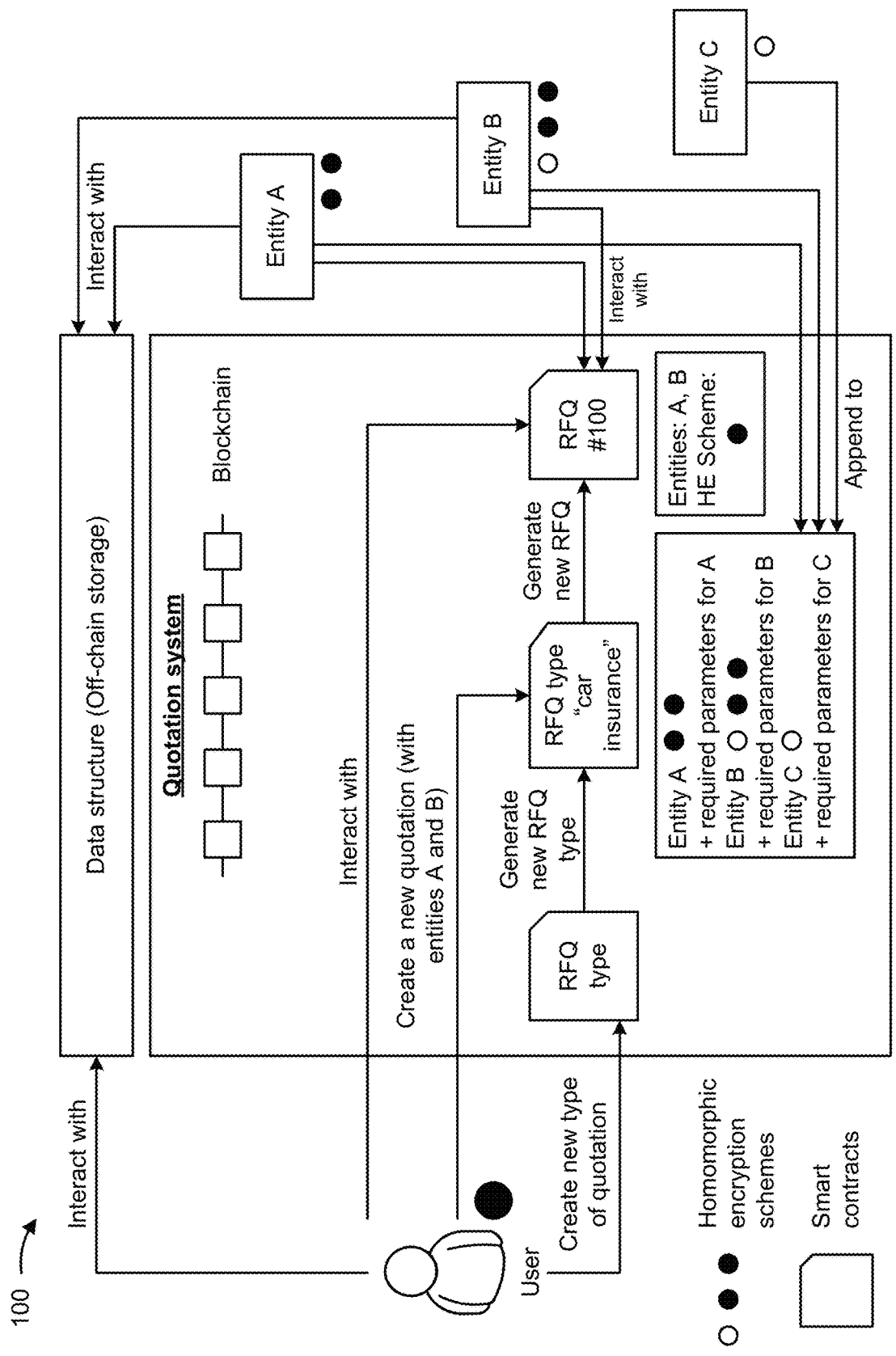

FIG. 1K is an example flow diagram associated with secure requests for quotations. As shown in FIG. 1K, a user accesses the quotation system to create a new type of quotation and to provide the new type of quotation to a plurality of entities.

For example, the user may subscribe to a quotation service provided by the quotation system. The user may input authentication information (e.g., a username and password) to a client device and the client device may provide the authentication information to the quotation system. The quotation system may authenticate the user based on the authentication information and may provide the user access the quotation service based on authenticating the user.

The user may provide information indicating that the quotation system is to generate a new request for quotation. For example, the quotation service may provide a user interface to the client device to cause the client device to provide the user interface for display to the user. The user interface may include an option for generating a new request for quotation. The user may use an input device of the client device to select the option. The client device may determine that the user selected the option and may provide information identifying the option to the quotation system.

The quotation system may receive the information identifying the option and may provide the client device a list of types of requests for quotations. The client device may receive the list and may provide the list for display to the user. The user may select a type of request for quotation from the list. As shown in FIG. 1K, the user selects a car insurance type of request for quotation. The client device may provide information identifying the car insurance type of request for quotation to the quotation system.

The quotation system may receive the information and may generate the car insurance type of request for quotation based on the information. A group of entities (shown in FIG. 1K as Entity A, Entity B, and Entity C) may determine that the quotation system generated the car insurance type of request for quotation. For example, the group of entities may determine that the quotation system generated the car insurance type of request for quotation based on receiving a notification from the quotation system, as described above.

As shown in FIG. 1K, the group of entities may provide entity information and entity encryption information to the quotation system by appending the entity information and the entity encryption information to the car insurance type of request for quotation. The quotation system may provide information indicating that the group of entities have appended the entity information and the entity encryption information to the client device.

The client device may receive the information from the quotation system and may provide a notification to the user indicating that the group of entities have appended the entity information and the entity encryption information to the client device. The user may view the entity information and the entity encryption information via the user interface.

As shown in FIG. 1K, the entity information may indicate parameters required by the group of entities and the entity encryption information may indicate one or more types of homomorphic encryption schemes that the entities may utilize. As also shown in FIG. 1K, the user (e.g., the client device) may utilize a particular type of homomorphic encryption scheme (indicated by a grey circle in FIG. 1K). The user may select Entity A and Entity B to receive the car insurance request for quotation based on the entity encryption information for Entity A and Entity B indicating that Entity A and Entity B are able to use the particular type of homomorphic encryption scheme.

The user may identify parameters required by Entity A and parameters required by Entity B based on the entity information for Entity A and Entity B. The user may input values for the required parameters via the user interface. The client device may generate a smart contract that includes information identifying Entities A and B and information identifying the input values. In some implementations, the client device may generate the smart contract in a manner similar to that described above. The client device may provide the smart contract to the quotation system.

The quotation system may receive the smart contract and may generate a modified smart contract based on the particular type of homomorphic encryption scheme, in a manner similar to that described above. The quotation system may utilize the modified smart contract to enable the user to receive secure requests for quotations in a manner similar to that described above.

Figure 1L:
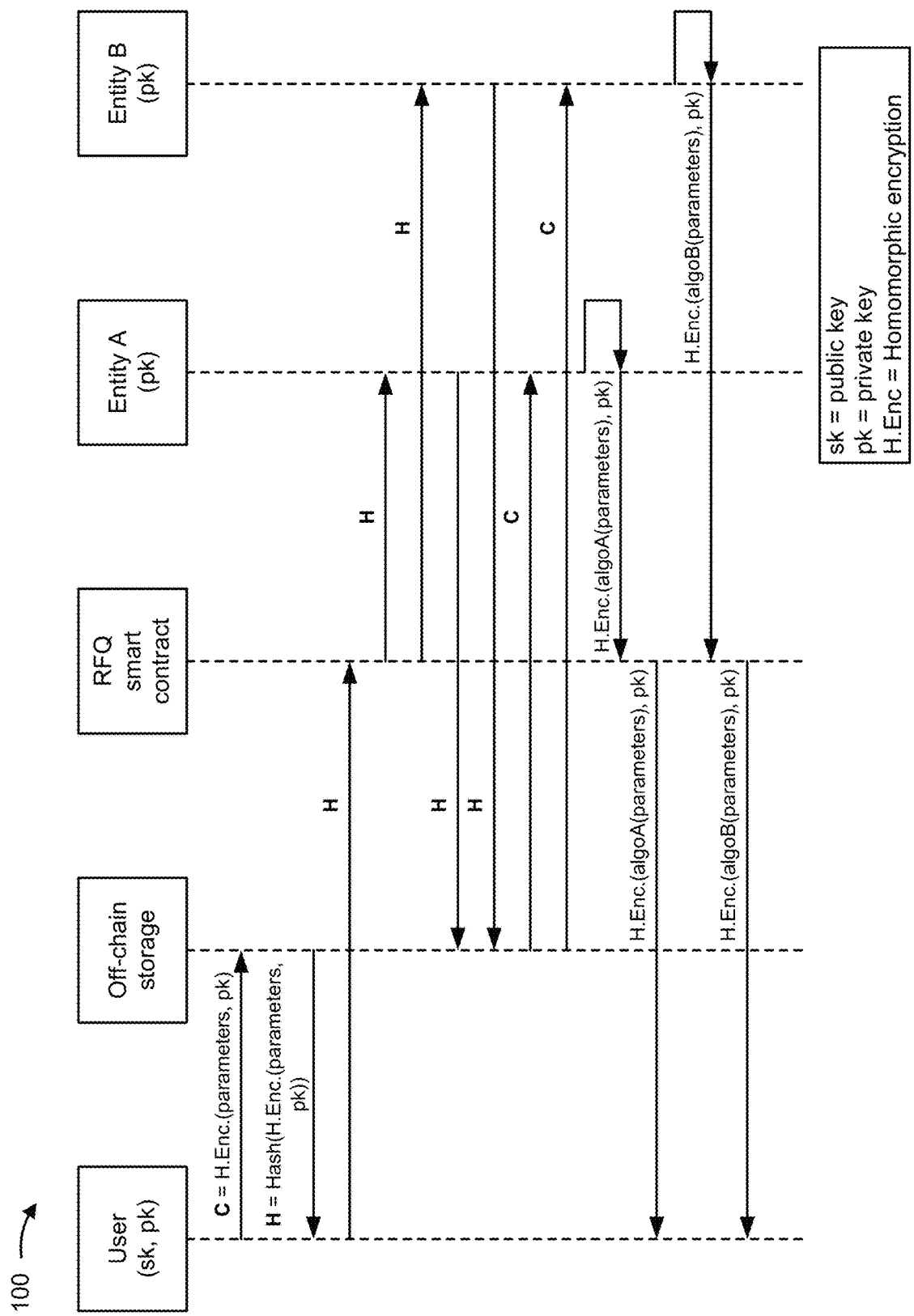
Figure 1M:
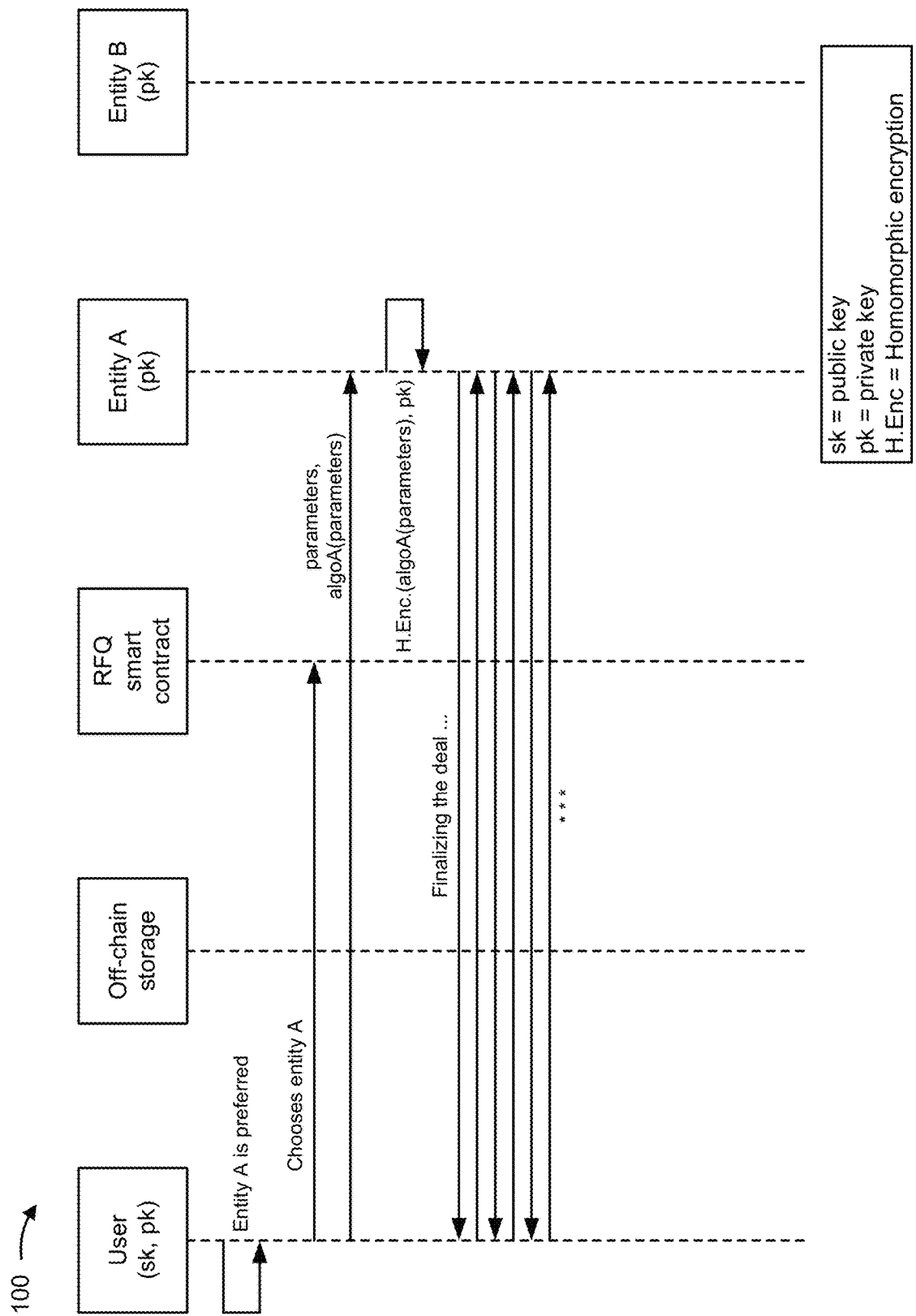

FIGS. 1L-1M are example call flow diagrams associated with secure requests for quotations. As shown in FIG. 1L, a user may utilize a homomorphic encryption scheme to encrypt a set of parameters with a private key to generate encrypted data C. The set of parameters may be one or more parameters associated with a secure request for quotation. The user may provide the encrypted data C to an off-chain storage associated with a quotation system.

The off-chain storage may store the set of encrypted data C and may generate a reference that can be used to access the encrypted data. As shown in FIG. 1L, the off-chain storage may generate the reference based on a hash H based on the encrypted data C and may provide the hash H to the user.

As shown in FIG. 1L, the user includes the hash H in the smart contract (shown in FIG. 1L as RFQ). The user provides the smart contract, including the hash H to entities A and B.

Entities A and B may receive the smart contract and may utilize the hash H to obtain the encrypted data C from the off-chain storage. As shown in FIG. 1L, Entity A may use a first algorithm (shown in FIG. 1L as algoA) to perform a computation on the encrypted data to generate a first response. Entity B may use a second algorithm (shown in FIG. 1L as algoB) to perform a computation on the encrypted data to generate a second response.

Entity A may include the first response in the smart contract received by Entity A and may provide the smart contract, including the first response, to the user. Entity B may include the second response in the smart contract received by Entity B and may provide the smart contract, including the second response, to the user.

The user may utilize the particular type of homomorphic encryption to decrypt the first response and the second response. The user may review the first response and the second response to determine a preferred entity (e.g., an entity able to provide an item at the lowest cost, an entity able to provide an item at an earliest date, and/or the like).

As shown in FIG. 1M, the user selects Entity A as the preferred entity. The user includes information identifying Entity A as the preferred entity in the smart contract. By including information identifying Entity A as the preferred entity in the smart contract, the user may establish a record identifying the entity selected by the user. Establishing a record identifying the entity selected by the user may provide information to each entity (e.g., Entity A and Entity B) indicating the entity selected by the user.

As shown in FIG. 1M, the user may provide information identifying parameters or terms to be negotiated to Entity A based on selecting Entity A as the preferred entity and/or based on including information identifying Entity A in the smart contract. The user and Entity A may perform a process for negotiating the identified parameters or terms, as described above, to finalize an agreement associated with Entity A providing the item associated with the request for quotation to the user.

As described herein, the quotation system may provide a secure means for requesting and/or obtaining quotations. By providing a reference to stored encrypted information, rather than the encrypted information, an amount of data transmitted between a client device and a server device may be reduced. A reduction in the amount of data transmitted between the client device and the server device, may enable the client device and the server device to conserve computing resources that would otherwise be utilized to transmit the encrypted information.

As indicated above, FIGS. 1A-1M are provided as an example. Other examples may differ from what is described with regard to FIGS. 1A-1M. The number and arrangement of devices shown in FIGS. 1A-1M are provided as an example. In practice, there may be additional devices, fewer devices, different devices, or differently arranged than those shown in FIGS. 1A-1M. Furthermore, two or more devices shown in FIGS. 1A-1M may be implemented within a single device, or a single device shown in FIGS. 1A-1M may be implemented as multiple, distributed devices. Additionally, or alternatively, a set of devices (e.g., one or more devices) shown in FIGS. 1A-1M may perform one or more functions described as being performed by another set of devices shown in FIGS. 1A-1M.

Figure 2:
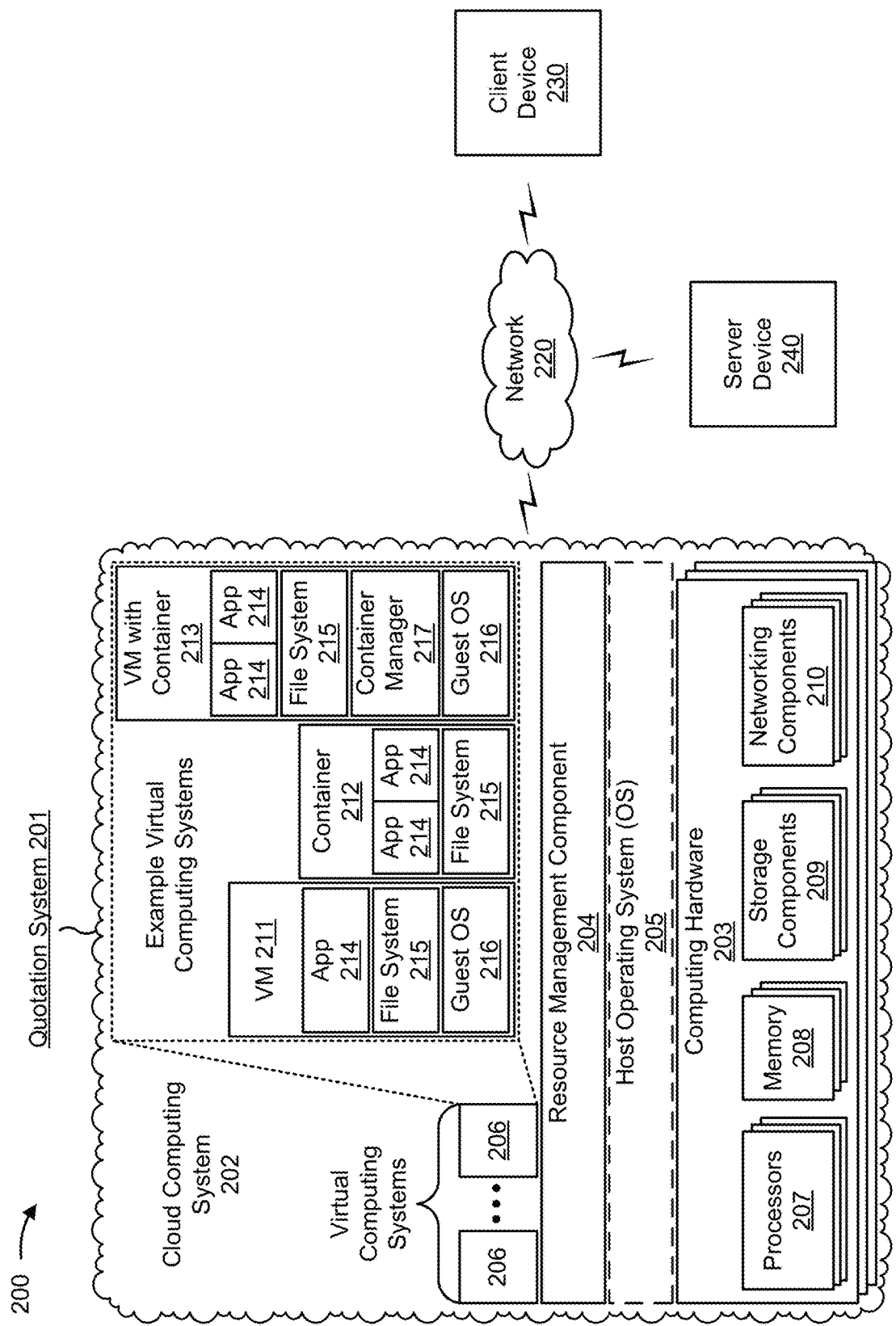
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a quotation system 201. The quotation system 201 may include one or more elements of a cloud computing system 202 and/or may execute within the cloud computing system 202 (e.g., as one or more virtual computing systems 206). The cloud computing system 202 may include one or more elements 203-217, as described in more detail below. As further shown in FIG. 2, environment 200 may include a network 220, a client device 230, and/or a server device 240. Devices of environment 200 may interconnect via wired connections, wireless connections, or a combination of wired and wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using such virtualization, the resource management component 204 enables a single computing device (e.g., a computer, a server, a host device, and/or the like) to operate as if the single computing device were multiple computing devices, such as by creating multiple isolated virtual computing systems 206 from computing hardware 203 of the single computing device. The multiple virtual computing systems 206 operate independently from one another and do not interact with one another. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server or host device) or from multiple computing devices (e.g., multiple servers or host devices), such as multiple computing devices in one or more data centers, server farms, server pools, and/or the like. As shown, computing hardware 203 may include one or more processors 207, one or more memories 208, one or more storage components 209, and/or one or more networking components 210. Computing hardware 203 may be interconnected via one or more wired and/or wireless buses, which may interconnect computing hardware 203 within a single computing device and/or across multiple computing devices.

A processor 207 includes a central processing unit, a graphics processing unit, and/or the like. A memory 208 includes random-access memory, read-only memory, and/or the like. The memory 208 may store a set of instructions (e.g., one or more instructions) for execution by the processor 207. The processor 207 may execute the set of instructions to perform one or more operations or processes described herein. In some implementations, execution of the set of instructions, by one or more processors 207, causes the one or more processors 207 and/or the quotation system 201 to perform one or more operations or processes described herein. A storage component 209 includes a hard disk or another type of storage device that stores information, data, and/or software (e.g., code, instructions, and/or the like) related to the operation and use of the quotation system 201. In some implementations, memory 208 and/or storage component 209 is/are implemented as a non-transitory computer readable medium. A networking component 210 includes a network interface and corresponding hardware that enables the quotation system 201 to communicate with other devices of environment 200 via a wired connection and/or a wireless connection, such as via network 220. Additional examples of a processor, a memory, a storage component, and a networking component (e.g., a communication interface) are described elsewhere herein.

The resource management component 204 includes a virtualization application (e.g., executing on hardware, such as computing hardware 203) capable of virtualizing computing hardware 203 to start (e.g., create or spin up), stop (e.g., delete or tear down), and/or manage one or more virtual computing systems 206. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 204 may control access to and/or use of computing hardware 203 and/or software executing on computing hardware 203. Additionally, or alternatively, the resource management component 204 may perform binary rewriting to scan instructions received from a virtual computing system 206 and replace any privileged instructions with safe emulations of those instructions. The resource management component 204 may include a hypervisor or a virtual machine monitor, such as when the virtual computing systems 206 are virtual machines 211. Additionally, or alternatively, the resource management component 204 may include a container manager, such as when the virtual computing systems 206 are containers 212.

In some implementations, the resource management component 204 executes within and/or in coordination with a host operating system 205. For example, the resource management component 204 may execute on top of the host operating system 205 rather than interacting directly with computing hardware 203, such as when the resource management component 204 is a hosted hypervisor (e.g., a Type 2 hypervisor) or a container manager. In this case, the host operating system 205 may control access to and/or use of computing hardware 203 and/or software executing on computing hardware 203 based on information and/or instructions received from the resource management component 204. Alternatively, the resource management component 204 may interact directly with computing hardware 203 rather than interacting with the host operating system 205, such as when the resource management component 204 is a bare-metal hypervisor (e.g., a Type 1 hypervisor). Thus, in some implementations, the cloud computing system 202 does not include a host operating system 205. In some implementations, the host operating system 205 includes and/or executes an administrator application to enable a system administrator to manage, customize, and/or configure cloud computing system 202.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications 214 using a file system 215. The file system 215 may include binary files, software libraries, and/or other resources required to execute applications 214 on a guest operating system 216 or the host operating system 205. In some implementations, a virtual computing system 206 (e.g., a virtual machine 211 or a hybrid environment 213) includes a guest operating system 216. In some implementations, a virtual computing system 206 (e.g., a container 212 or a hybrid environment 213) includes a container manager 217.

A virtual machine 211 is an emulation of a computing device that enables execution of separate, isolated instances of virtual computing devices (e.g., multiple virtual machines 211) on the same computing hardware 203. The guest operating systems 216 and applications 214 of multiple virtual machines 211 may share computing hardware 203 from a single computing device or from multiple computing devices (e.g., a pool of computing devices). Each separate virtual machine 211 may include a guest operating system 216, a file system 215, and one or more applications 214. With a virtual machine 211, the underlying computing hardware 203 is virtualized, and the guest operating system 216 executes on top of this virtualized hardware. Using virtual machines 211 enables different types of guest operating systems 216 to execute on the same computing hardware 203 in an isolated environment, but with more resource usage and overhead than containers 212.

Unlike a virtual machine 211, a container 212 virtualizes a host operating system 205 rather than the underlying computing hardware 203. Thus, a container 212 does not require a guest operating system 216 because the application(s) 214 included in the container 212 execute directly on the host operating system 205 using a file system 215 included in the container 212. Each separate container 212 may share the kernel of the host operating system 205, and different applications 214 within a single container 212 may share a file system 215. This sharing of a file system 215 among multiple applications 214 reduces the need to reproduce operating system code for different applications, and enables a single host operating system 205 to execute multiple applications 214 and/or containers 212. As a result, containers 212 enable a greater quantity of applications 214 to execute on a smaller quantity of computing devices as compared to virtual machines 211.

A hybrid environment 213 includes elements of a virtual machine 211 and a container 212. For example, a hybrid environment 213 may include a guest operating system 216 that executes on top of virtualized hardware. A container manager 217 may execute on top of the guest operating system 216 to start, stop, and/or manage one or more containers within the hybrid environment 213. Using a hybrid environment 213 enables different types of guest operating systems 216 to execute on the same computing hardware 203 in an isolated environment, while also enabling lightweight containers to execute on top of the guest operating system 216.

The quantity of applications 214 shown in FIG. 2 as executing within each virtual computing system 206 is shown as an example, and a different quantity of applications 214 may execute within each virtual computing system. Furthermore, although the quotation system 201 may include one or more elements 203-217 of the cloud computing system 202, may execute within the cloud computing system 202, and/or may be hosted within the cloud computing system 202, in some implementations, the quotation system 201 may not be cloud-based (e.g., may be implemented outside of a cloud computing system) or may be partially cloud-based. For example, the quotation system 201 may include one or more devices that are not part of the cloud computing system 202, such as device 300 of FIG. 3, which may include a standalone server or another type of computing device. The quotation system 201 may perform one or more operations and/or processes described in more detail elsewhere herein.

Network 220 includes one or more wired and/or wireless networks. For example, network 220 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 220 enables communication among the devices of environment 200.

The client device 230 includes one or more devices capable of receiving, generating, storing, processing, and/or providing information associated with requesting a secure quotation, as described elsewhere herein. The client device 230 may include a communication device and/or a computing device. For example, the client device 230 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 230 may communicate with one or more other devices of environment 200, as described elsewhere herein.

The server device 240 includes one or more devices capable of receiving, generating, storing, processing, providing, and/or routing information associated with secure requests for quotations, as described elsewhere herein. The server device 240 may include a communication device and/or a computing device. For example, the server device 240 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The server device 240 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
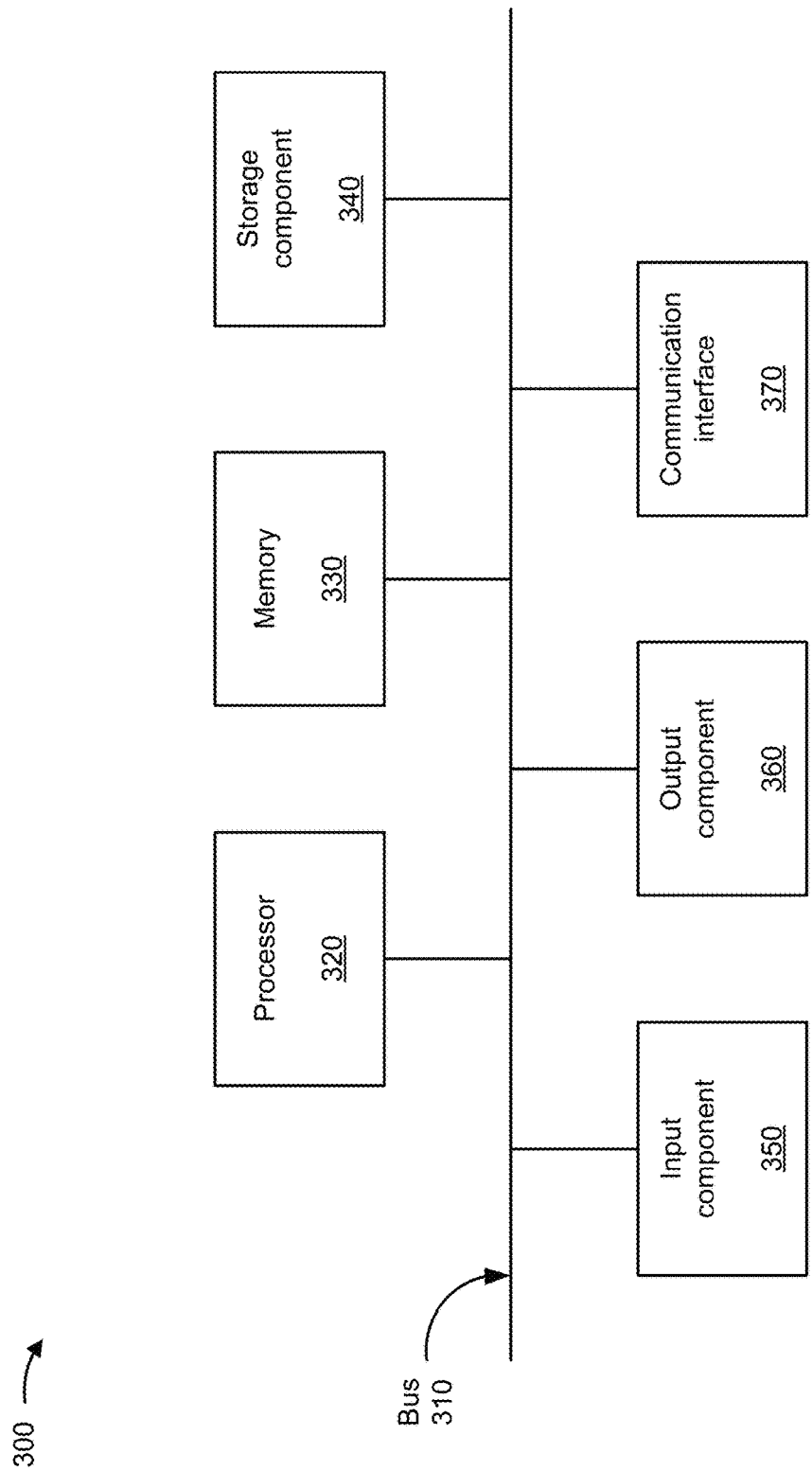
FIG. 3 is a diagram of example components of one or more devices of FIG. 2.

FIG. 3 is a diagram of example components of a device 300. Device 300 may correspond to quotation system 201, client device 230, and/or server device 240. In some implementations, quotation system 201, client device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, an RF interface, a universal serial bus (USB) interface, a wireless local area interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
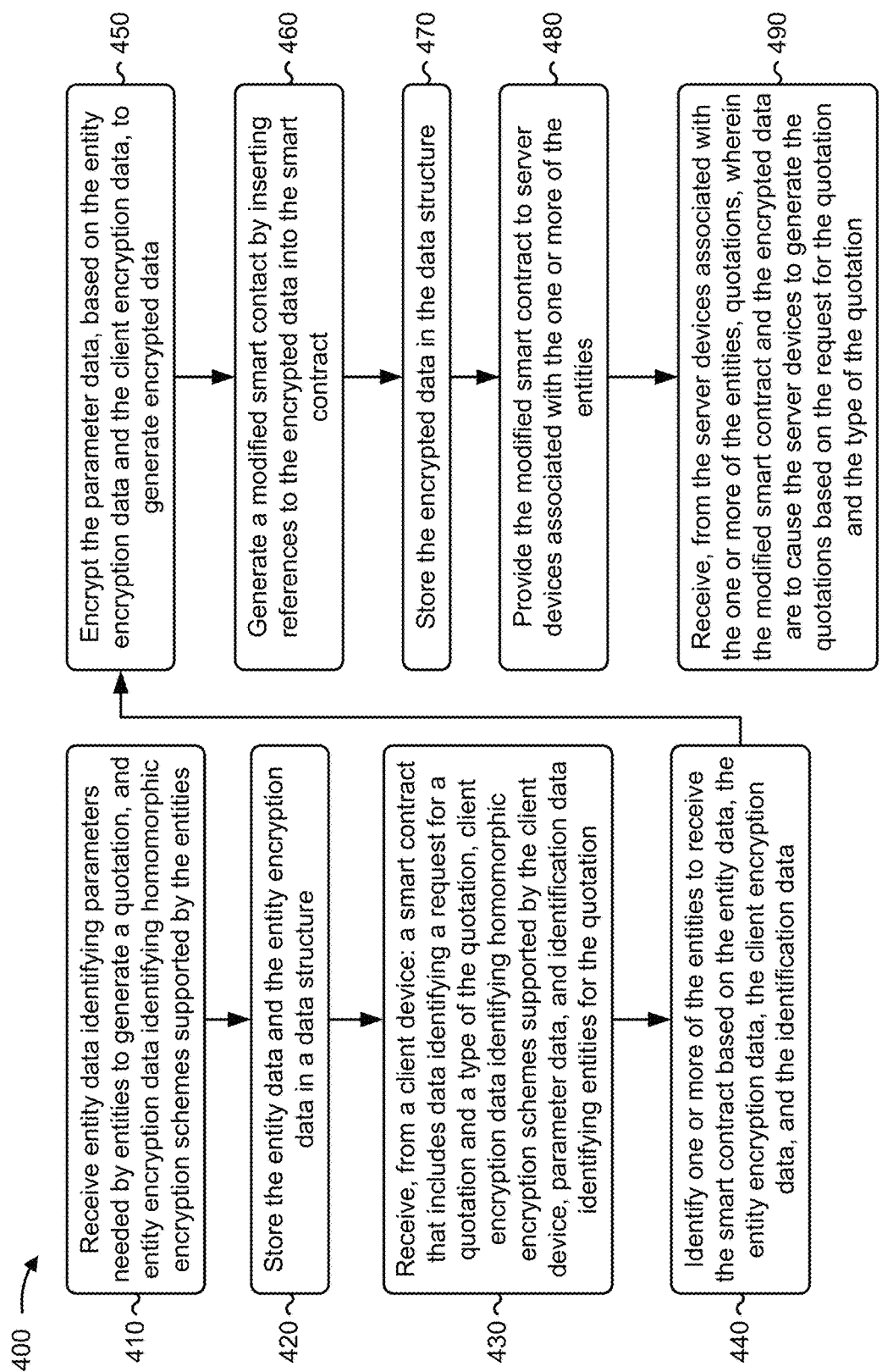

FIG. 4 is a flow chart of an example process 400 associated with systems and methods for secure requests for quotations. In some implementations, one or more process blocks of FIG. 4 may be performed by a quotation system (e.g., quotation system 201). In some implementations, one or more process blocks of FIG. 4 may be performed by another device or a group of devices separate from or including the device, such as a client device (e.g., client device 230), a server device (e.g., server device 240), and/or the like.

As shown in FIG. 4, process 400 may include receiving entity data identifying parameters needed by entities to generate a quotation, and entity encryption data identifying homomorphic encryption schemes supported by the entities (block 410). For example, the device (e.g., using processor 320, memory 330, storage component 340, input component 350, output component 360, communication interface 370, and/or the like) may receive entity data identifying parameters needed by entities to generate a quotation, and entity encryption data identifying homomorphic encryption schemes supported by the entities, as described above.

As further shown in FIG. 4, process 400 may include storing the entity data and the entity encryption data in a data structure (block 420). For example, the device (e.g., using processor 320, memory 330, storage component 340, input component 350, output component 360, communication interface 370, and/or the like) may store the entity data and the entity encryption data in a data structure, as described above.

As further shown in FIG. 4, process 400 may include receiving, from a client device: data identifying a request for a quotation and a type of the quotation, client encryption data identifying homomorphic encryption schemes supported by the client device, parameter data identifying values of the parameters needed by the entities to generate the quotation, and identification data identifying entities for the quotation (block 430). For example, the device (e.g., using processor 320, memory 330, storage component 340, input component 350, output component 360, communication interface 370, and/or the like) may receive, by the device and from a client device, data identifying a request for a quotation and a type of the quotation, client encryption data identifying homomorphic encryption schemes supported by the client device, parameter data identifying values of the parameters needed by the entities to generate the quotation, and identification data identifying entities for the quotation, as described above.

As further shown in FIG. 4, process 400 may include identifying one or more of the entities to receive a smart contract based on the entity data, the entity encryption data, the client encryption data, and the identification data (block 440). For example, the device (e.g., using processor 320, memory 330, storage component 340, input component 350, output component 360, communication interface 370, and/or the like) may identify one or more of the entities to receive the smart contract based on the entity data, the entity encryption data, the client encryption data, and the identification data, as described above.

As further shown in FIG. 4, process 400 may include encrypting the parameter data, based on the entity encryption data and the client encryption data, to generate encrypted data (block 450). For example, the device (e.g., using processor 320, memory 330, storage component 340, input component 350, output component 360, communication interface 370, and/or the like) may encrypt the parameter data, based on the entity encryption data and the client encryption data, to generate encrypted data, as described above.

As further shown in FIG. 4, process 400 may include generating a modified smart contact by inserting references to the encrypted data into the smart contract (block 460). For example, the device (e.g., using processor 320, memory 330, storage component 340, input component 350, output component 360, communication interface 370, and/or the like)

may generate a modified smart contact by inserting references to the encrypted data into the smart contract, as described above.

As further shown in FIG. 4, process 400 may include storing the encrypted data in the data structure (block 470). For example, the device (e.g., using processor 320, memory 330, storage component 340, input component 350, output component 360, communication interface 370, and/or the like) may store the encrypted data in the data structure, as described above.

As further shown in FIG. 4, process 400 may include providing the modified smart contract to server devices associated with the one or more of the entities (block 480). For example, the device (e.g., using processor 320, memory 330, storage component 340, input component 350, output component 360, communication interface 370, and/or the like) may provide the modified smart contract to server devices associated with the one or more of the entities, as described above.

As further shown in FIG. 4, process 400 may include receiving, from the server devices associated with the one or more of the entities, quotations, wherein the modified smart contract and the encrypted data are to cause the server devices to generate the quotations based on the request for the quotation and the type of the quotation (block 490). For example, the device (e.g., using processor 320, memory 330, storage component 340, input component 350, output component 360, communication interface 370, and/or the like) may receive, from the server devices associated with the one or more of the entities, quotations, as described above. In some implementations, the modified smart contract and the encrypted data are to cause the server devices to generate the quotations based on the request for the quotation and the type of the quotation.

Process 400 may include additional implementations, such as any single implementation or any combination of implementations described below and/or in connection with one or more other processes described elsewhere herein.

In a first implementation, process 400 includes encrypting the quotations, based on the entity encryption data and the client encryption data, to generated encrypted quotations; inserting references to the encrypted quotations into the modified smart contract; and storing the encrypted quotations in the data structure.

In a second implementation, alone or in combination with the first implementation, process 400 includes providing, to the client device, the modified smart contract with the references to the encrypted quotations; receiving, from the client device, data identifying a particular entity of the one or more of the entities, wherein the particular entity is being associated with a quotation selected from the quotations; receiving, from the client device, the modified smart contract with terms of the quotation to be negotiated with the particular entity; and enabling the client device and a particular server device associated with the particular entity to securely negotiate the terms of the quotation.

In a third implementation, alone or in combination with one or more of the first and second implementations, encrypting the parameter data, based on the entity encryption data and the client encryption data, to generate the encrypted data comprises: encrypting the parameter data, with a homomorphic encryption scheme supported by the client device and the server devices, to generate the encrypted data.

In a fourth implementation, alone or in combination with one or more of the first through third implementations, the homomorphic encryption schemes include one or more of: a partially homomorphic encryption scheme, a somewhat homomorphic encryption scheme, a leveled fully homomorphic encryption scheme, or a fully homomorphic encryption scheme.

In a fifth implementation, alone or in combination with one or more of the first through fourth implementations, the type of quotation includes one or more of: a quotation associated with sale of a product, a quotation associated with an autonomous vehicle delivering a package, a quotation associated with an unmanned aerial vehicle delivering a package, a quotation associated with an autonomous vehicle delivering supplies, a quotation associated with an autonomous vehicle delivering supplies, or a quotation associated with a robot performing an operation.

In a sixth implementation, alone or in combination with one or more of the first through fifth implementations, the encrypted data is stored in the data structure due to a memory size of the encrypted data being too large for provision in the modified smart contract.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 associated with systems and methods for secure requests for quotations. In some implementations, one or more process blocks of FIG. 5 may be performed by a quotation system (e.g., quotation system 201). In some implementations, one or more process blocks of FIG. 5 may be performed by another device or a group of devices separate from or including the device, such as a client device (e.g., client device 230), a server device (e.g., server device 240), and/or the like.

As shown in FIG. 5, process 500 may include receiving entity data identifying parameters needed by entities to generate a quotation, and entity encryption data identifying homomorphic encryption schemes supported by the entities (block 505). For example, the device (e.g., using processor 320, memory 330, storage component 340, input component 350, output component 360, communication interface 370, and/or the like) may receive entity data identifying parameters needed by entities to generate a quotation, and entity encryption data identifying homomorphic encryption schemes supported by the entities, as described above.

As further shown in FIG. 5, process 500 may include storing the entity data and the entity encryption data in a data structure (block 510). For example, the device (e.g., using processor 320, memory 330, storage component 340, input component 350, output component 360, communication interface 370, and/or the like) may store the entity data and the entity encryption data in a data structure, as described above.

As further shown in FIG. 5, process 500 may include receiving, from a client device: data identifying a request for a quotation and a type of the quotation, client encryption data identifying homomorphic encryption schemes supported by the client device, parameter data indicating values of the parameters needed by the entities to generate the quotation, and identification data identifying entities for the quotation (block 515). For example, the device (e.g., using processor 320, memory 330, storage component 340, input component 350, output component 360, communication interface 370, and/or the like) may receive, from a client device, data identifying a request for a quotation and a type of the quotation, client encryption data identifying homomorphic encryption schemes supported by the client device, parameter data indicating values of the parameters needed by the entities to generate the quotation, and identification data identifying entities for the quotation, as described above.

As further shown in FIG. 5, process 500 may include identifying one or more of the entities to receive the smart contract based on the entity data, the entity encryption data, the client encryption data, and the identification data (block 520). For example, the device (e.g., using processor 320, memory 330, storage component 340, input component 350, output component 360, communication interface 370, and/or the like) may identify one or more of the entities to receive the smart contract based on the entity data, the entity encryption data, the client encryption data, and the identification data, as described above.

As further shown in FIG. 5, process 500 may include encrypting the parameter data, based on the entity encryption data and the client encryption data, to generate encrypted data (block 525). For example, the device (e.g., using processor 320, memory 330, storage component 340, input component 350, output component 360, communication interface 370, and/or the like) may encrypt the parameter data, based on the entity encryption data and the client encryption data, to generate encrypted data, as described above.

As further shown in FIG. 5, process 500 may include generating a modified smart contact by inserting references to the encrypted data in the smart contract (block 530). For example, the device (e.g., using processor 320, memory 330, storage component 340, input component 350, output component 360, communication interface 370, and/or the like) may generate a modified smart contact by inserting references to the encrypted data in the smart contract, as described above.

As further shown in FIG. 5, process 500 may include storing the encrypted data in the data structure (block 535). For example, the device (e.g., using processor 320, memory 330, storage component 340, input component 350, output component 360, communication interface 370, and/or the like) may store the encrypted data in the data structure, as described above.

As further shown in FIG. 5, process 500 may include providing the modified smart contract to server devices associated with the one or more of the entities (block 540). For example, the device (e.g., using processor 320, memory 330, storage component 340, input component 350, output component 360, communication interface 370, and/or the like) may provide the modified smart contract to server devices associated with the one or more of the entities, as described above.

As further shown in FIG. 5, process 500 may include receiving, from the server devices associated with the one or more of the entities, quotations, wherein the modified smart contract and the encrypted data are to cause the server devices to generate the quotations based on the request for the quotation and the type of the quotation (block 545). For example, the device (e.g., using processor 320, memory 330, storage component 340, input component 350, output component 360, communication interface 370, and/or the like) may receive, from the server devices associated with the one or more of the entities, quotations, as described above. In some implementations, the modified smart contract and the encrypted data are to cause the server devices to generate the quotations based on the request for the quotation and the type of the quotation.

As further shown in FIG. 5, process 500 may include encrypting the quotations, based on the entity encryption data and the client encryption data, to generated encrypted quotations (block 550). For example, the device (e.g., using processor 320, memory 330, storage component 340, input component 350, output component 360, communication interface 370, and/or the like) may encrypt the quotations, based on the entity encryption data and the client encryption data, to generated encrypted quotations, as described above.

As further shown in FIG. 5, process 500 may include inserting references to the encrypted quotations in the modified smart contract (block 555). For example, the device (e.g., using processor 320, memory 330, storage component 340, input component 350, output component 360, communication interface 370, and/or the like) may insert references to the encrypted quotations in the modified smart contract, as described above.

As further shown in FIG. 5, process 500 may include storing the encrypted quotations in the data structure (block 560). For example, the device (e.g., using processor 320, memory 330, storage component 340, input component 350, output component 360, communication interface 370, and/or the like) may store the encrypted quotations in the data structure, as described above.

As further shown in FIG. 5, process 500 may include providing, to the client device, the modified smart contract with the references to the encrypted quotations (block 565). For example, the device (e.g., using processor 320, memory 330, storage component 340, input component 350, output component 360, communication interface 370, and/or the like) may provide, to the client device, the modified smart contract with the references to the encrypted quotations, as described above.

Process 500 may include additional implementations, such as any single implementation or any combination of implementations described below and/or in connection with one or more other processes described elsewhere herein.

In a first implementation, process 500 includes causing the client device to securely select a quotation from the quotations provided in the modified smart contract; and causing the client device and a particular server device, associated with a particular entity that provided the quotation, to securely negotiate a contract based on the quotation.

In a second implementation, alone or in combination with the first implementation, process 500 includes selecting a particular homomorphic encryption scheme based on the entity encryption data and the client encryption data; and encrypt the parameter data, with the particular homomorphic encryption scheme, to generate the encrypted data.

In a third implementation, alone or in combination with one or more of the first and second implementations, process 500 includes causing the client device to securely select a quotation from the quotations provided in the modified smart contract; and causing the client device and a particular server device, associated with a particular entity that provided the quotation, to directly negotiate a contract based on the quotation and outside of the modified smart contract.

In a fourth implementation, alone or in combination with one or more of the first through third implementations, process 500 includes causing the client device to securely select a quotation from the quotations provided in the modified smart contract; and causing a particular entity associated with the quotation to be required to honor the quotation based on the modified smart contract.

In a fifth implementation, alone or in combination with one or more of the first through fourth implementations, the data identifying the request for the quotation includes personal data associated with a user of the client device.

In a sixth implementation, alone or in combination with one or more of the first through fifth implementations, process 500 includes causing the client device to securely select a quotation from the quotations provided in the modified smart contract, wherein a particular entity is being associated with the quotation; and automatically is generating a contract between a user of the client device and the particular entity based on the quotation and the modified smart contract.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 associated with systems and methods for secure requests for quotations. In some implementations, one or more process blocks of FIG. 6 may be performed by a quotation system (e.g., quotation system 201). In some implementations, one or more process blocks of FIG. 6 may be performed by another device or a group of devices separate from or including the device, such as a client device (e.g., client device 230), a server device (e.g., server device 240), and/or the like.

As shown in FIG. 6, process 600 may include receiving entity data identifying parameters needed by entities to generate a quotation, and entity encryption data identifying homomorphic encryption schemes supported by the entities (block 610). For example, the device (e.g., using processor 320, memory 330, storage component 340, input component 350, output component 360, communication interface 370, and/or the like) may receive entity data identifying parameters needed by entities to generate a quotation, and entity encryption data identifying homomorphic encryption schemes supported by the entities, as described above.

As further shown in FIG. 6, process 600 may include storing the entity data and the entity encryption data in a data structure (block 620). For example, the device (e.g., using processor 320, memory 330, storage component 340, input component 350, output component 360, communication interface 370, and/or the like) may store the entity data and the entity encryption data in a data structure, as described above.

As further shown in FIG. 6, process 600 may include receiving, from a client device: data identifying a request for a quotation and a type of the quotation, client encryption data identifying homomorphic encryption schemes supported by the client device, parameter data identifying values of the parameters needed by the entities to generate the quotation, and identification data identifying entities for the quotation (block 630). For example, the device (e.g., using processor 320, memory 330, storage component 340, input component 350, output component 360, communication interface 370, and/or the like) may receive, from a client device, data identifying a request for a quotation and a type of the quotation, client encryption data identifying homomorphic encryption schemes supported by the client device, parameter data identifying values of the parameters needed by the entities to generate the quotation, and identification data identifying entities for the quotation, as described above.

As further shown in FIG. 6, process 600 may include identifying one or more of the entities to receive the smart contract based on the entity data, the entity encryption data, the client encryption data, and the identification data (block 640). For example, the device (e.g., using processor 320, memory 330, storage component 340, input component 350, output component 360, communication interface 370, and/or the like) may identify one or more of the entities to receive the smart contract based on the entity data, the entity encryption data, the client encryption data, and the identification data, as described above.

As further shown in FIG. 6, process 600 may include encrypting the parameter data, based on the entity encryption data and the client encryption data, to generate encrypted data (block 650). For example, the device (e.g., using processor 320, memory 330, storage component 340, input component 350, output component 360, communication interface 370, and/or the like) may encrypt the parameter data, based on the entity encryption data and the client encryption data, to generate encrypted data, as described above.

As further shown in FIG. 6, process 600 may include generating a modified smart contact by inserting references to the encrypted data in the smart contract (block 660). For example, the device (e.g., using processor 320, memory 330, storage component 340, input component 350, output component 360, communication interface 370, and/or the like) may generate a modified smart contact by inserting references to the encrypted data in the smart contract, as described above.

As further shown in FIG. 6, process 600 may include storing the encrypted data in the data structure (block 670). For example, the device (e.g., using processor 320, memory 330, storage component 340, input component 350, output component 360, communication interface 370, and/or the like) may store the encrypted data in the data structure, as described above.

As further shown in FIG. 6, process 600 may include providing the modified smart contract to server devices associated with the one or more of the entities (block 680). For example, the device (e.g., using processor 320, memory 330, storage component 340, input component 350, output component 360, communication interface 370, and/or the like) may provide the modified smart contract to server devices associated with the one or more of the entities, as described above.

As further shown in FIG. 6, process 600 may include receiving, from the server devices associated with the one or more of the entities, quotations, wherein the modified smart contract and the encrypted data are to cause the server devices to generate the quotations based on the request for the quotation and the type of the quotation (block 690). For example, the device (e.g., using processor 320, memory 330, storage component 340, input component 350, output component 360, communication interface 370, and/or the like) may receive, from the server devices associated with the one or more of the entities, quotations, as described above. In some implementations, the modified smart contract and the encrypted data are to cause the server devices to generate the quotations based on the request for the quotation and the type of the quotation.

Process 600 may include additional implementations, such as any single implementation or any combination of implementations described below and/or in connection with one or more other processes described elsewhere herein.

In a first implementation, process 600 includes encrypting the parameter data, with a homomorphic encryption scheme supported by the client device and the server devices, to generate the encrypted data.

In a second implementation, alone or in combination with the first implementation, process 600 includes causing the client device and a particular server device, associated with a particular entity that provided the quotation, to securely negotiate a contract based on the quotation.

In a third implementation, alone or in combination with one or more of the first and second implementations, process 600 includes selecting a particular homomorphic encryption scheme based on the entity encryption data and the client encryption data; and encrypt the data is including in the smart contract, with the particular homomorphic encryption scheme, to generate the encrypted data.

In a fourth implementation, alone or in combination with one or more of the first through third implementations, process 600 includes causing the client device and a particular server device, associated with a particular entity that provided the quotation, to directly negotiate a contract based on the quotation and outside of the modified smart contract.

In a fifth implementation, alone or in combination with one or more of the first through fourth implementations, process 600 includes causing a particular entity associated with the quotation to be required to honor the quotation based on the modified smart contract.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, entity data identifying parameters needed by entities to generate a quotation, and entity encryption data identifying homomorphic encryption schemes supported by the entities;
   storing, by the device, the entity data and the entity encryption data in a data structure;
   receiving, by the device and from a client device:
      data identifying a request for the quotation and a type of the quotation,
      client encryption data identifying homomorphic encryption schemes supported by the client device,
      parameter data identifying values of the parameters needed by the entities to generate the quotation, and
      identification data identifying entities for the quotation;
   identifying, by the device, one or more of the entities to receive a smart contract based on the entity data, the entity encryption data, the client encryption data, and the identification data;
   encrypting, by the device, the parameter data, based on the entity encryption data and the client encryption data, to generate encrypted data;
   generating, by the device, a modified smart contact by inserting references to the encrypted data into the smart contract;
   storing, by the device, the encrypted data in the data structure;
   providing, by the device, the modified smart contract to server devices associated with the one or more of the entities; and
   receiving, by the device and from the server devices associated with the one or more of the entities, quotations,
   wherein the modified smart contract and the encrypted data are configured to cause the server devices to generate the quotations based on the request for the quotation and the type of the quotation.

2. The method of claim 1, further comprising: encrypting the quotations, based on the entity encryption data and the client encryption data, to generate encrypted quotations; inserting references to the encrypted quotations into the modified smart contract; and storing the encrypted quotations in the data structure.

3. The method of claim 2, further comprising:
providing, to the client device, the modified smart contract with the references to the encrypted quotations;
receiving, from the client device, data identifying a particular entity of the one or more of the entities,
wherein the particular entity is associated with a quotation selected from the quotations;
receiving, from the client device, terms of the quotation to be negotiated with the particular entity; and
enabling the client device and a particular server device associated with the particular entity to securely negotiate the terms of the quotation.

4. The method of claim 1, wherein encrypting the parameter data, based on the entity encryption data and the client encryption data, to generate the encrypted data comprises:
encrypting the parameter data with a homomorphic encryption scheme supported by the client device and the server devices to generate the encrypted data.

5. The method of claim 1, wherein the homomorphic encryption schemes include one or more of:
a partially homomorphic encryption scheme,
a somewhat homomorphic encryption scheme,
a leveled fully homomorphic encryption scheme, or
a fully homomorphic encryption scheme.

6. The method of claim 1, wherein the type of quotation includes one or more of:
a quotation associated with sale of a product,
a quotation associated with an autonomous vehicle delivering a package,
a quotation associated with an unmanned aerial vehicle delivering a package,
a quotation associated with an autonomous vehicle delivering supplies,
a quotation associated with an autonomous vehicle delivering supplies, or
a quotation associated with a robot performing an operation.

7. The method of claim 1, wherein the encrypted data is stored in the data structure due to a memory size of the encrypted data being too large for provision in the modified smart contract.

8. A device, comprising:
one or more memories; and
one or more processors, communicatively coupled to the one or more memories, configured to:
receive entity data identifying parameters needed by entities to generate a quotation, and entity encryption data identifying homomorphic encryption schemes supported by the entities;
store the entity data and the entity encryption data in a data structure;
receive, from a client device:
data identifying a request for the quotation and a type of the quotation,
client encryption data identifying homomorphic encryption schemes supported by the client device,
parameter data indicating values of the parameters needed by the entities to generate the quotation, and
identification data identifying entities for the quotation;
identify one or more of the entities to receive a smart contract based on the entity data, the entity encryption data, the client encryption data, and the identification data;
encrypt the parameter data, based on the entity encryption data and the client encryption data, to generate encrypted data;
generate a modified smart contact by inserting references to the encrypted data in the smart contract;
store the encrypted data in the data structure;
provide the modified smart contract to server devices associated with the one or more of the entities;
receive, from the server devices associated with the one or more of the entities, quotations,
wherein the modified smart contract and the encrypted data are configured to cause the server devices to generate the quotations based on the request for the quotation and the type of the quotation;
encrypt the quotations, based on the entity encryption data and the client encryption data, to generated encrypted quotations;
insert references to the encrypted quotations in the modified smart contract;
store the encrypted quotations in the data structure; and
provide, to the client device, the modified smart contract with the references to the encrypted quotations.

9. The device of claim 8, wherein the one or more processors are further configured to:
cause the client device to securely select a quotation from the quotations provided in the modified smart contract; and
cause the client device and a particular server device, associated with a particular entity that provided the quotation, to securely negotiate a contract based on the quotation.

10. The device of claim 8, wherein the one or more processors, when encrypting the parameter data, based on the entity encryption data and the client encryption data, to generate the encrypted data, are configured to:
select a particular homomorphic encryption scheme based on the entity encryption data and the client encryption data; and
encrypt the parameter data, with the particular homomorphic encryption scheme, to generate the encrypted data.

11. The device of claim 8, wherein the one or more processors are further configured to:
cause the client device to securely select a quotation from the quotations provided in the modified smart contract; and
cause the client device and a particular server device, associated with a particular entity that provided the quotation, to directly negotiate a contract based on the quotation and outside of the modified smart contract.

12. The device of claim 8, wherein the one or more processors are further configured to:
cause the client device to securely select a quotation from the quotations provided in the modified smart contract.

13. The device of claim 8, wherein the data identifying the request for the quotation includes personal data associated with a user of the client device.

14. The device of claim 8, wherein the one or more processors are further configured to:
- cause the client device to securely select a quotation from the quotations provided in the modified smart contract, wherein a particular entity is associated with the quotation; and
- automatically generate a contract between a user of the client device and the particular entity based on the quotation and the modified smart contract.

15. A non-transitory computer-readable medium storing instructions, the instructions comprising:
- one or more instructions that, when executed by one or more processors, cause the one or more processors to:
  - receive entity data identifying parameters needed by entities to generate a quotation, and entity encryption data identifying homomorphic encryption schemes supported by the entities;
  - store the entity data and the entity encryption data in a data structure;
  - receive, from a client device:
    - data identifying a request for the quotation and a type of the quotation associated with a smart contract,
    - client encryption data identifying homomorphic encryption schemes supported by the client device,
    - parameter data identifying values of the parameters needed by the entities to generate the quotation, and
    - identification data identifying entities for the quotation;
  - identify one or more of the entities to receive the smart contract based on the entity data, the entity encryption data, the client encryption data, and the identification data;
  - encrypt the parameter data, based on the entity encryption data and the client encryption data, to generate encrypted data;
  - generate a modified smart contract by inserting references to the encrypted data in the smart contract;
  - store the encrypted data in the data structure;
  - provide the modified smart contract to server devices associated with the one or more of the entities;
  - receive, from the server devices associated with the one or more of the entities, quotations,
    - wherein the modified smart contract and the encrypted data are configured to cause the server devices to generate the quotations based on the request for the quotation and the type of the quotation,
  - encrypt the quotations, based on the entity encryption data and the client encryption data, to generated encrypted quotations;
  - insert references to the encrypted quotations in the modified smart contract;
  - store the encrypted quotations in the data structure;
  - provide, to the client device, the modified smart contract with the references to the encrypted quotations;
  - receive, from the client device, data identifying a particular entity of the one or more of the entities, wherein the particular entity is associated with a quotation selected from the quotations; and
  - enable the client device and a particular server device associated with the particular entity to securely negotiate terms of the quotation.

16. The non-transitory computer-readable medium of claim 15, wherein the one or more instructions, that cause the one or more processors to encrypt the parameter data, based on the entity encryption data and the client encryption data, to generate the encrypted data, cause the one or more processors to:
- encrypt the parameter data, with a homomorphic encryption scheme supported by the client device and the server devices, to generate the encrypted data.

17. The non-transitory computer-readable medium of claim 15, wherein the one or more instructions, when executed by the one or more processors, further cause the one or more processors to:
- cause the client device and a particular server device, associated with a particular entity that provided the quotation, to securely negotiate a contract based on the quotation.

18. The non-transitory computer-readable medium of claim 15, wherein the one or more instructions, that cause the one or more processors to encrypt the parameter data, based on the entity encryption data and the client encryption data, to generate the encrypted data, cause the one or more processors to:
- select a particular homomorphic encryption scheme based on the entity encryption data and the client encryption data; and
- encrypt the parameter data, with the particular homomorphic encryption scheme, to generate the encrypted data.

19. The non-transitory computer-readable medium of claim 15, wherein the one or more instructions, when executed by the one or more processors, further cause the one or more processors to:
- cause the client device and a particular server device, associated with a particular entity that provided the quotation, to directly negotiate a contract based on the quotation and outside of the modified smart contract.

20. The non-transitory computer-readable medium of claim 15, wherein the one or more instructions, when executed by the one or more processors, further cause the one or more processors to:
- cause the client device to securely select a particular quotation from the quotations provided in the modified smart contract.

* * * * *